United States Patent
Nemirovsky et al.

(10) Patent No.: US 10,868,752 B2
(45) Date of Patent: Dec. 15, 2020

(54) INTELLIGENT ADAPTIVE TRANSPORT LAYER TO ENHANCE PERFORMANCE USING MULTIPLE CHANNELS

(71) Applicant: StarFlow Networks, Inc., Los Gatos, CA (US)

(72) Inventors: Mario Nemirovsky, Barcelona (ES); René Serral-Graciá, Barcelona (ES); Francesco Ciaccia, Barcelona (ES); Ivan Romero Ruiz, Barcelona (ES)

(73) Assignee: Clevernet, Inc., San Francisco, CA (US)

( * ) Notice: Subject to any disclaimer, the term of this patent is extended or adjusted under 35 U.S.C. 154(b) by 444 days.

(21) Appl. No.: 15/626,130

(22) Filed: Jun. 18, 2017

(65) Prior Publication Data

US 2017/0366445 A1 Dec. 21, 2017

Related U.S. Application Data

(60) Provisional application No. 62/351,953, filed on Jun. 18, 2016.

(51) Int. Cl.
*H04L 12/721* (2013.01)
*H04L 12/727* (2013.01)
*H04L 29/08* (2006.01)

(52) U.S. Cl.
CPC ............ *H04L 45/12* (2013.01); *H04L 45/121* (2013.01); *H04L 45/124* (2013.01); *H04L 67/322* (2013.01)

(58) Field of Classification Search
CPC ..... H04L 45/12–245; H04L 47/00–829; H04L 67/32–327
See application file for complete search history.

(56) References Cited

U.S. PATENT DOCUMENTS 8,289,845 B1 * 10/2012 Baldonado ............ H04L 43/50
370/229
2016/0105364 A1 4/2016 Kanokakis
(Continued)

OTHER PUBLICATIONS

"Multiprotocol Label Switching Architecture," Request for Comments: 3031, Internet Engineering Task Force, Jan. 2001.
(Continued)

*Primary Examiner* — Clayton R Williams
(74) *Attorney, Agent, or Firm* — Stephen W. Melvin

(57) ABSTRACT

A set of connections is established, continuously evaluated and maintained between two endpoints of a computer network for use in transmitting information flows in a more efficient and controlled manner. New connections are established and existing connections are terminated in a continual search for connections with better and/or different performance characteristics. Each connection may utilize the same or a different path through the network and may have performance characteristics that change over time. Several paths can be used simultaneously for a given information flow to improve network metrics including: throughput, transaction time, data consistency, latency and packet loss. Flows of information can be broken into one or more sub-flows and sub-flows can be assigned to one or more active connections. Furthermore, dynamic decisions regarding how flows are broken up and how they are assigned to connections can be made in response to network conditions. Through the use of these connections, a reduced cost can be offered and application QoS/QoE can be guaranteed, allowing existing networks such as the public Internet to provide an enterprise class connection, which can be used to accelerate enterprise cloud adoption without modifying the present Internet infrastructure.

23 Claims, 16 Drawing Sheets

(56) References Cited

U.S. PATENT DOCUMENTS

2016/0261504 A1* 9/2016 Sung ............... H04L 47/18
2017/0019332 A1* 1/2017 Burgess ............ H04L 69/14

OTHER PUBLICATIONS

"What is the cost of MPLS?", Mushroom Networks Blog, Aug. 20, 2015, https://www.mushroomnetworks.com/blog/2015/08/20/what-is-the-cost-of-mpls/, Retrieved on May 10, 2017.

M. Armbrust, A. Fox, R. Griffith, A. Joseph, R. Katz, A. Konwinski, G. Lee, D. Patterson, A. Rabkin, I. Stoica and M. Zaharia, "Above the Clouds: A Berkeley View of Cloud Computing," University of California at Berkeley Technical Report No. UCB/EECS-2009-28, Feb. 10, 2009.

"A View of Cloud Computing," M. Armbrust et al., Communications of the ACM, vol. 53, No. 4, pp. 50-58, Apr. 2010.

"Architectural Guidelines for Multipath TCP Development," Request for Comments: 6182, Internet Engineering Task Force, Mar. 2011.

"Datagram Congestion Control Protocol (DCCP)," Request for Comments: 4340, Internet Engineering Task Force, Mar. 2006.

"Stream Control Transmission Protocol," Request for Comments: 4960, Internet Engineering Task Force, Sep. 2007.

C. Huang and M. Lin, "Partially Reliable-Concurrent Multipath Transfer (PR-CMT) for Multihomed Networks," Proceedings of IEEE Global Telecommunications Conference (GLOBECOM), 2008.

"A Framework for IP Based Virtual Private Networks," Request for Comments: 2764, Internet Engineering Task Force, Feb. 2000.

"IP Security (IPsec) and Internet Key Exchange (IKE) Document Roadmap," Request for Comments: 6071, Internet Engineering Task Force, Feb. 2011.

C. Huang, Y. Chen and S. Lin, "Packet Scheduling and Congestion Control Schemes for Multipath Datagram Congestion Control Protocol," The Computer Journal, Jan. 12, 2014.

B. Augustin, X. Cuvellier, B. Orgogozo, F. Viger, T. Friedman, M. Latapy, C. Magnien and R. Teixeira, "Avoiding traceroute anomalies with Paris traceroute", Proceedings of IMC'06, Oct. 25-27, 2006, Rio de Janeiro, Brazil.

A. Mestres, A. Rodriguez-Natal, J. Carner, P. Barlet-Ros, E. Alarcon, M. Sole, V. Muntes-Muleroy, D. Meyerz, S. Barkaix, M. Hibbett, G. Estrada, K. Maruf, F. Coras, V. Ermagan, H. Latapie, C. Cassar, J. Evans, F. Maino, J. Walrand and A. Cabellos, "Knowledge-Defined Networking", arXiv:1606.06222v2 [cs.NI] Jun. 23, 2016.

"IP Packet Delay Variation Metric for IP Performance Metrics (IPPM)," Request for Comments: 3393, Internet Engineering Task Force, Nov. 2002.

* cited by examiner

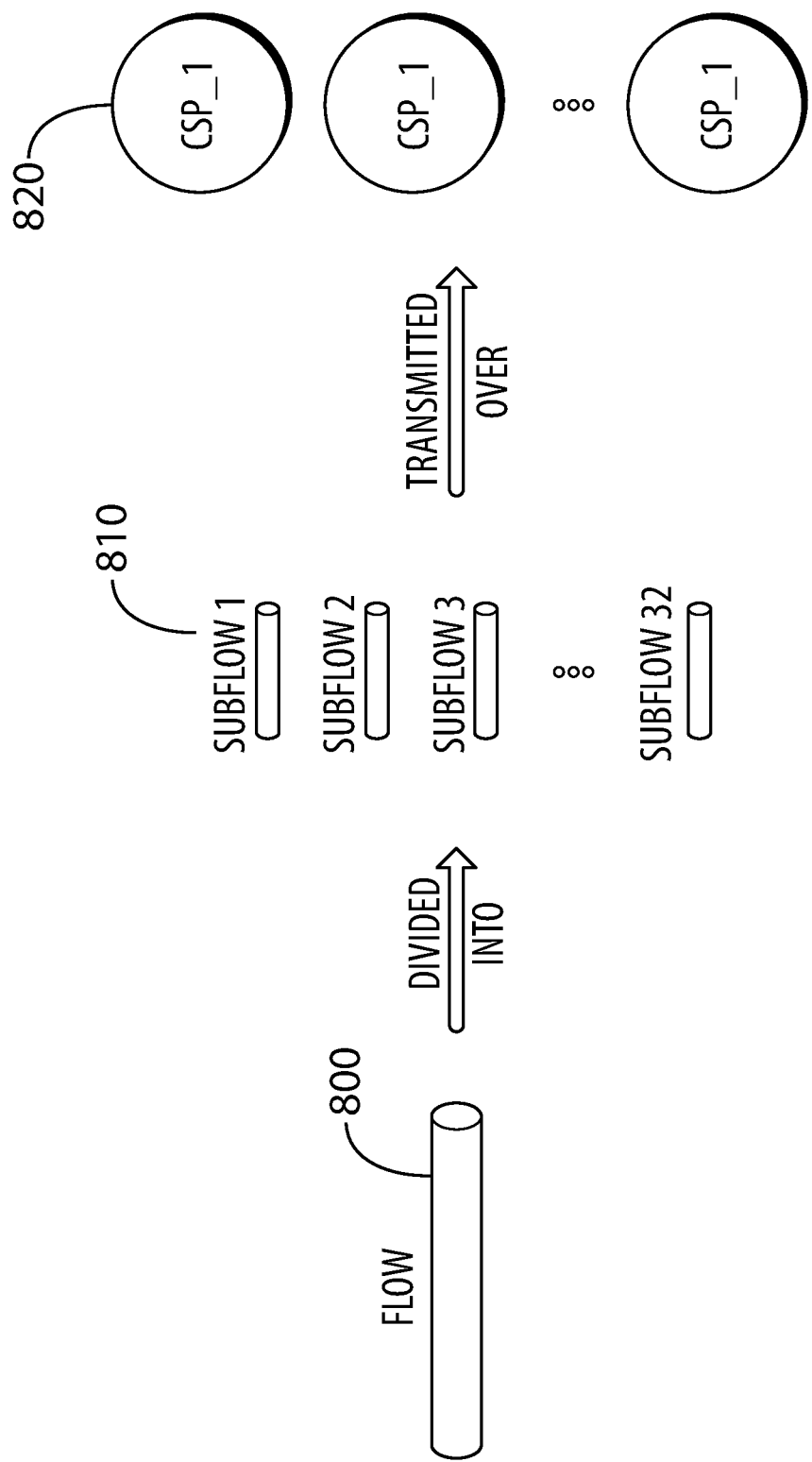

INTELLIGENT ADAPTIVE TRANSPORT LAYER TO ENHANCE PERFORMANCE USING MULTIPLE CHANNELS

RELATED APPLICATIONS

This application claims priority to U.S. Provisional Application No. 62/351,953, filed on Jun. 18, 2016, which is incorporated herein by reference.

BACKGROUND

This invention relates to the field of computer networking, and more specifically to controlling network metrics such as latency, flow completion time (FCT) and throughput between endpoints of a packet-switched network. This includes networks such as the public Internet, private networks, and 3G/4G/5G mobile networks.

The Internet provides excellent connectivity while ensuring properties such as resilience, decentralization, and best effort packet delivery. However, these characteristics result in low utilization of the Internet core to handle peaks of traffic. In addition, the Internet is not generally deterministic, a fact that inhibits its utilization for critical applications. Enterprises typically deploy private networks to ensure metrics of interest including throughput and latency. However, private networks have large operational expenses (OPEX) and capital expenditures (CAPEX) and not all enterprises can afford them. Virtual Private Networks (VPN) use the Internet as the underlying technology to emulate the benefits of private networks. VPNs rely on tunneling techniques to ensure security and performance over a public network. However, VPNs typically use a single tunnel to transmit information without guaranteeing network metrics, a critical aspect for enterprises. Some systems apply a packet switching layer, such as the Multiprotocol Labeled System (MPLS), to prioritize traffic, but this only works within the network of a specific carrier. What is needed is an improved method of controlling metrics such as throughput while guaranteeing Quality of Service (QoS) or Quality of Experience (QoE) when the traffic traverses the public Internet.

The Internet Protocol suite (TCP/IP) provides an end-to-end framework for communication, specifying how data is sent from one point to the other. This model is commonly presented through the OSI seven-layered architecture or a four layer scheme (link, internet, transport, application). This system has allowed the Internet to scale as the number of endpoints has grown rapidly while keeping its cost low. Today, the public Internet is one of the primary systems on which a vast amount of services and applications rely. Many companies use the Internet to provide services and to manage their infrastructure.

A significant disadvantage of the public Internet is that is not generally possible to offer deterministic services guaranteeing network metrics such as latency and throughput. This fact has caused several institutions and companies to build private networks to ensure a certain Quality of Service (QoS). Such networks are also connected to the public Internet but only for minimal purposes or for non-critical services through firewalls. These systems are expensive deployments since their deployment and maintenance is handled by large private companies. In contrast, the public Internet is a network of networks with a shared infrastructure around the world operating under consolidated protocols.

These private networks, whether physical or virtual, rely on different network protocols and technologies to interconnect their endpoints. For instance, Multiprotocol Label Switching (MPLS), described in Internet Engineering Task Force (IETF) Request for Comments (RFC) 3031, incorporated herein by reference, offers controllable performance and reliability compared to standard Internet connections thanks to virtual dedicated communication channels. Among other optimization techniques, it prioritizes traffic based on different parameters such as the application type. However, MPLS deployments typically come with a much higher cost, in order of 100 times more per Mbit. See for example "What is the cost of MPLS?," Mushroom Networks Blog, Aug. 20, 2015, incorporated herein by reference.

In recent years, the appearance of Cloud Computing has aggravated the interconnection problem. See for example "A View of Cloud Computing," M. Armbrust et al, incorporated herein by reference. Cloud Computing offers the externalization of a flexible infrastructure offered as an on-demand service, paying for the resources actually used. However, there is a critical point in the Cloud Computing model, the communication between enterprises, where the data is generated and consumed, and datacenters, where the data is sometimes processed and stored. This fact has inhibited the consolidation of the Cloud Computing paradigm. According to some industry leaders only five percent of workloads are in the public cloud. The main reasons are security, lock-in cost, data privacy, and network costs, which are aggravated by the reluctance from IT teams.

There are missing pieces needed to achieve the potential of Cloud Computing such as the use of a network capable of managing critical applications and the need to ensure certain boundaries for non-critical applications. Currently, only large companies can pay for the dedicated links needed for private Wide Area Networks (WANs). Furthermore, these networks present scalability problems since they rely on point-to-point connections instead of a packet switching network, giving up the main benefits of a network such as the public Internet. Lately, the largest Cloud Service Providers have tackled this problem by offering solutions to connect private datacenters to their public clouds. For example, Amazon Web Services offers Direct Connect and Microsoft Azure has ExpressRoute. However, these solutions address the problem by using private connections to their Cloud. Thus, the problem of a network connection with low cost and excellent scalability while maintaining the reliability remains unsolved.

BRIEF DESCRIPTION OF THE DRAWINGS

FIG. 8 illustrates a division of a flow inside multiple CSPs.

DETAILED DESCRIPTION

Embodiments of the present invention make intelligent use of the public Internet to guarantee application Quality of Service (QoS) or Quality of Experience (QoE) using its current infrastructure. While Quality of Service (QoS) objectively measures service parameters (such as packet loss rates or average throughput), Quality of Experience (QoE) is a different but related concept that measures a customer's experiences with a service (e.g., web browsing, phone call, TV broadcast, or call to a Call Center). The key premise is to maintain the reduced priced and its scalability while simultaneously providing guaranteed QoS/QoE.

Using embodiments of the present invention a set of connections is established between multiple endpoints to transmit information in a more efficient and controlled way. Through these connections a reduced cost can be offered and application QoS/QoE can be guaranteed for network metrics such as throughput, packet loss and latency. Employing embodiments of the present invention allow the existing networks such as the public Internet to provide an enterprise class connection, which can be used to accelerate enterprise cloud adoption without modifying the present Internet infrastructure.

Embodiments of the present invention are based on the observation that there is unused capacity in most of the networks, especially in the Internet. In order to absorb traffic peaks, routers in the core are over provisioned, and therefore run at a low utilization level. This means that except in periods of congestion, there is plenty of unused bandwidth. To use this extra bandwidth, tools and techniques utilized could use multi-path protocols. Several paths are used simultaneously to improve different network metrics including: throughput, transaction time, data consistency, latency, and packet loss. Furthermore, dynamic decisions are made in response to network conditions.

The following acronyms are used herein:
CSP Certified Starflow™ Path
QoE Quality of Experience
ASP Aggregated Secured Paths
BW Bandwidth
QA Quality Assurance
LCI Local Contextual Information
GCI Global Contextual Information In this specification the term Internet is used to mean the public Internet, or any other packet switched network utilizing Internet Protocols, whether public or private. Embodiments of the present invention can be employed under a variety of different scenarios. Described below are some of the scenarios of interest.

Scenario 1: Enterprise: Office Interconnection

Figure 1:
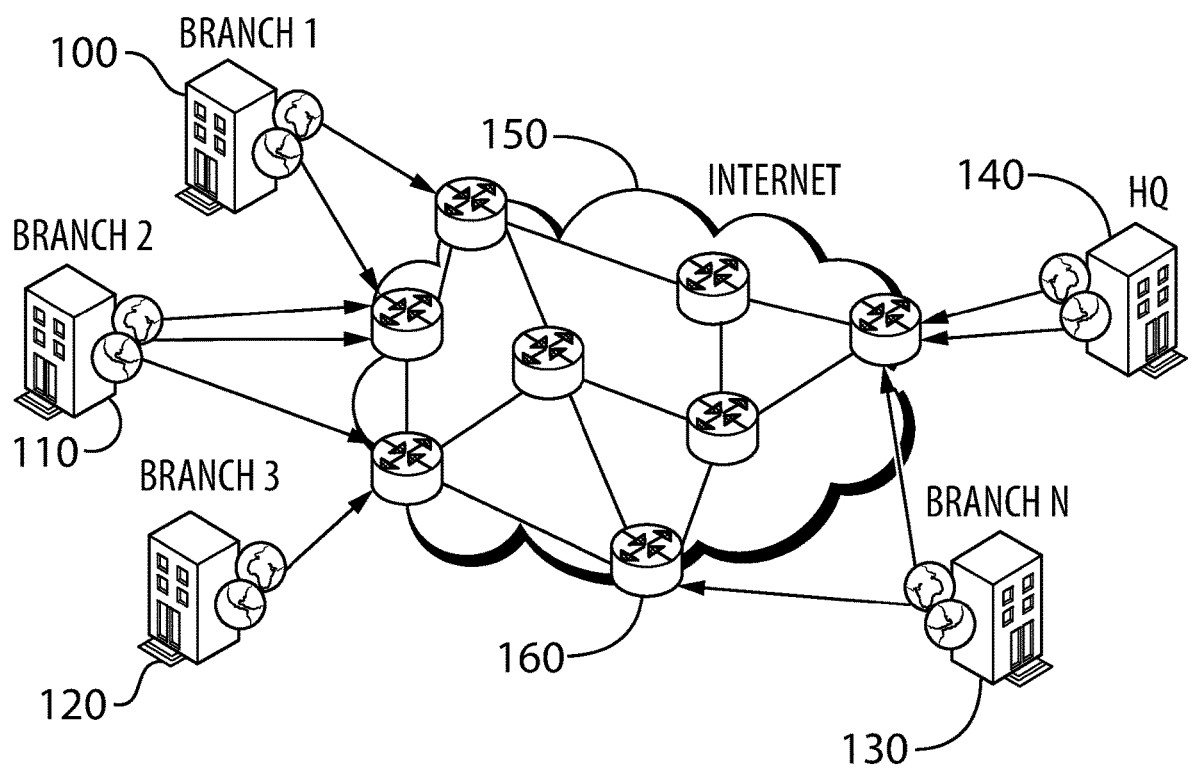
FIG. 1 illustrates an example of an Enterprise scenario.

In this scenario, depicted in FIG. 1, Branch Offices (100, 110, 120, 130) establish connections to their Headquarters HQ (140). Multiple Routers (e.g. 160) on the public Internet (150) are used to establish connections. Currently used private links are no longer required because embodiments of the present invention offer QoE guarantees. Rather than relying on private links, intelligent policies take advantage of the existing overcapacity of the Internet, 3G/4G/5G mobile networks and/or private networks using multipath techniques. This solution results in a virtual private WAN where companies experience high performance while reducing the OPEX and CAPEX.

Figure 2:
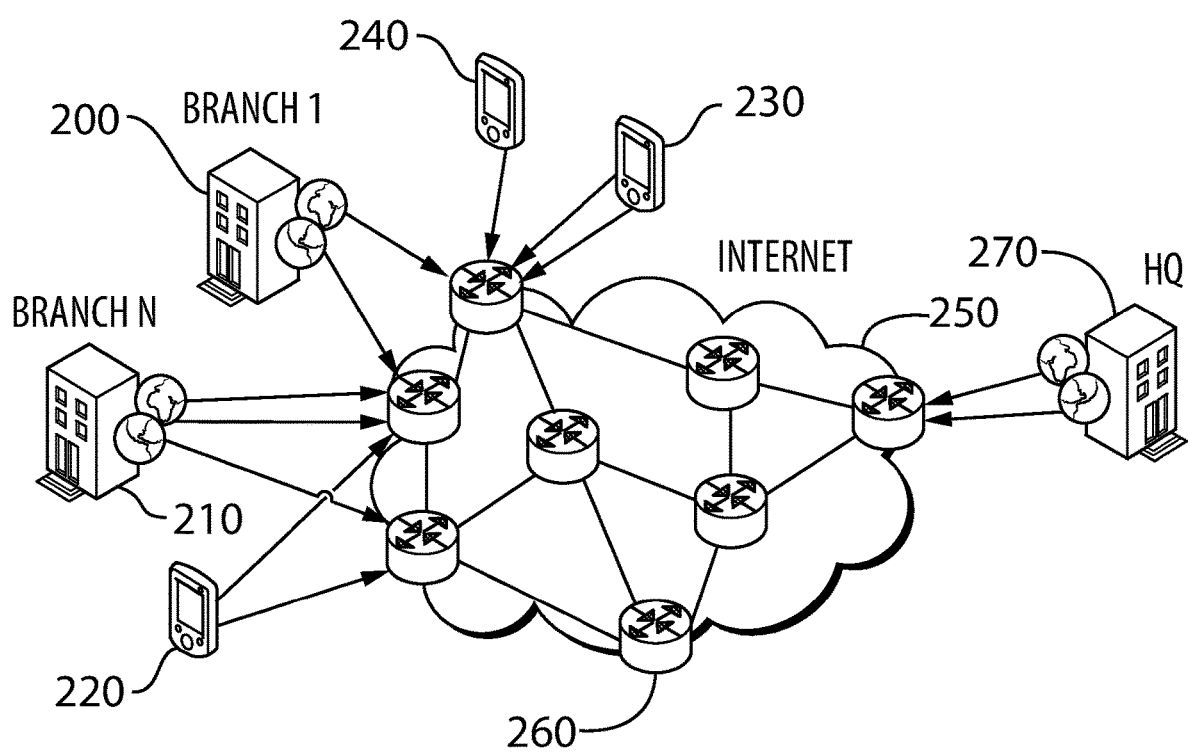
FIG. 2 illustrates an example of an Enterprise scenario.

In FIG. 2, the Enterprise scenario is illustrated with mobile devices. Branch Offices (200, 210) as well as Mobile Devices (220, 230, 240) are coupled to the public Internet (250) through Routers (260) and to Headquarters (HQ) (270). Mobile devices add a new dimension to the office interconnection scenario. In this case, devices are not confined within the boundaries of physical locations but have different mobility patterns. For example, a mobile device establishes a connection with HQ while staying in a specific branch office. Subsequently, that employee may visit a customer in another location taking that device with them. The present invention handles those situations without cutting the connection or degrading the QoE. Furthermore, additional constraints may apply based on enterprise premises. A company policy may specify that all devices need to be connected first to an office to use a firewall. Another company may allow mobile devices to connect directly to HQs. Although these are high-level situations, it is clear that the number of mobile devices and their mobility patterns will impact the solution presented by the present invention.

Scenario 2: Cloud: Connecting Cloud Datacenters with Clients

Figure 3:
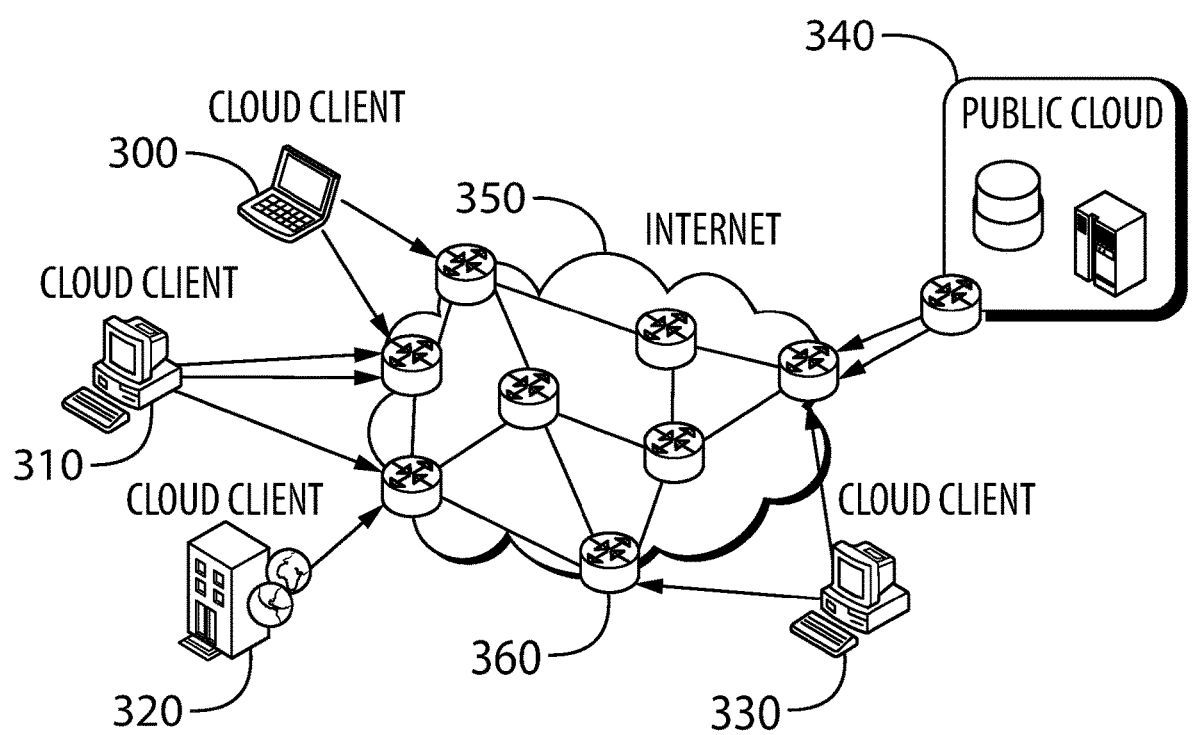
FIG. 3 illustrates an example of a Cloud scenario.

FIG. 3 depicts a scenario involving the Cloud. Rather than connecting branch offices to the headquarters, multiple clients (300, 310, 320, 330) are coupled to a public Cloud datacenter (340) through the public Internet (350) through Routers (360). There are two main schools of thought in the Cloud space. Some leading companies (e.g., Amazon and Google) focus exclusively on the public Cloud, which runs all the processing, and stores the data. In contrast, other companies (e.g., Microsoft) advocate a hybrid Cloud model, which allows for partitioning the workload and storage between the public Cloud and private enterprise clouds.

Embodiments of the present invention uses the same underlying technology in the Cloud scenario as in the Enterprise scenario. Each endpoint (client or cloud) uses multipath technology to simultaneously enable multiple paths, thus ensuring the required access QoE.

Figure 4:
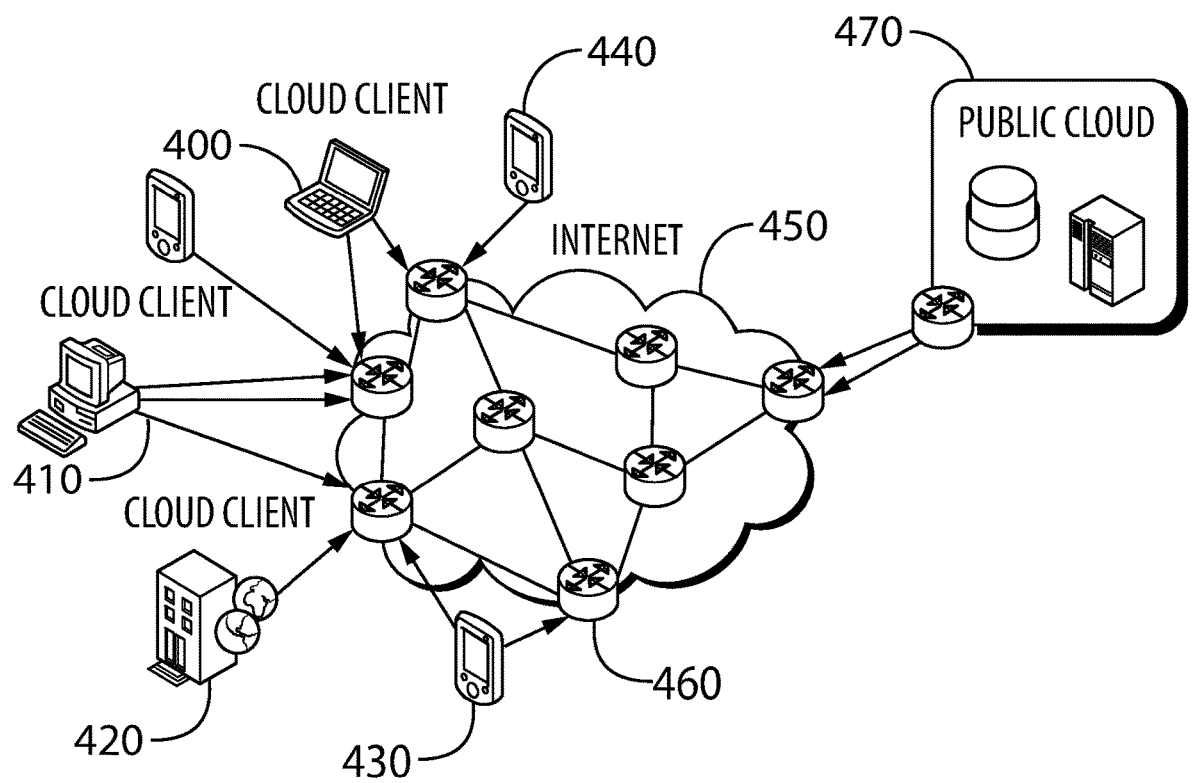
FIG. 4 illustrates an example of a Cloud scenario.

Mobile devices can also be considered as Cloud clients. FIG. 4 illustrates a Cloud scenario incorporating mobile devices. Clients (400, 410, 420) and Mobile Clients (430, 440) are coupled together using the public Internet (450) through Routers (460) and to the Cloud Datacenter (470). Key differentiations between the Cloud and Enterprise scenarios include the wide variety of application types, traffic patterns, resource sharing and the administration of those resources among others.

Scenario 3: Global Scenario

Figure 5:
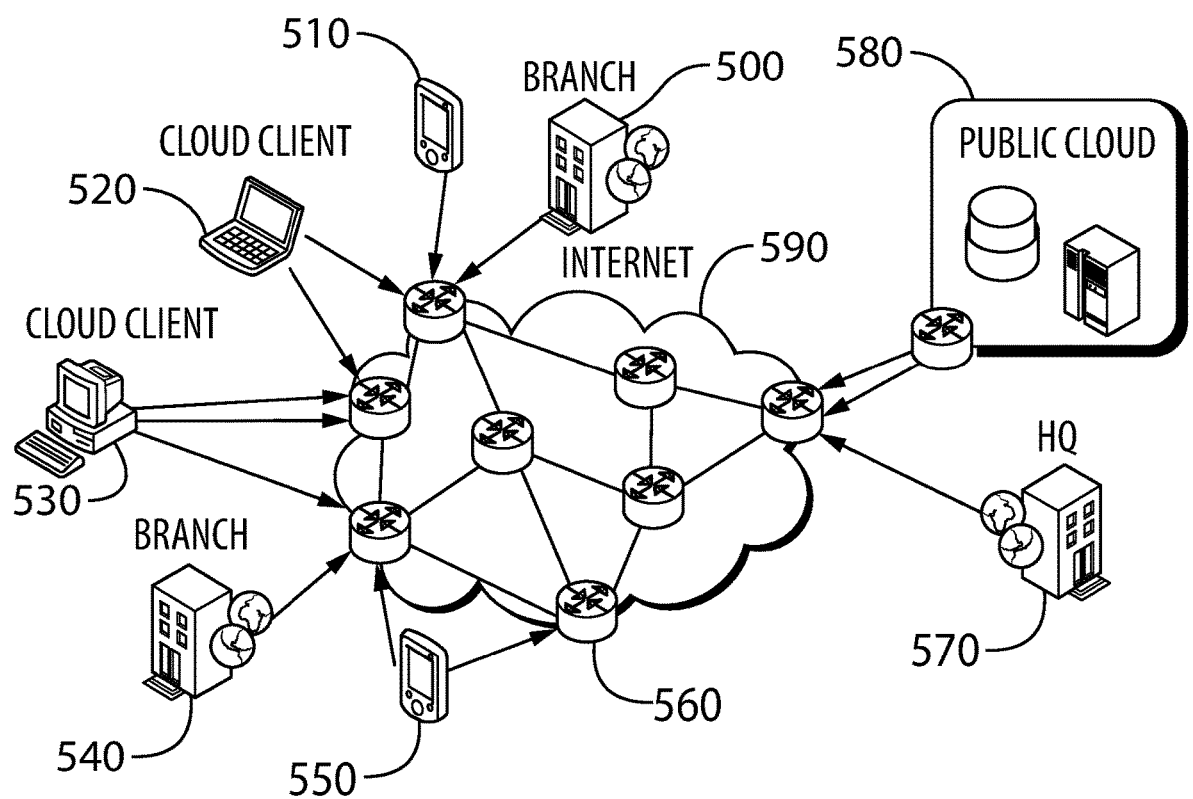
FIG. 5 illustrates an example of a Global scenario.

FIG. 5 illustrates a Global or All-to-All scenario. This scenario results from the combination of the Enterprise and the Cloud scenarios, including mobile devices. Clients (500, 520, 530, 540) and Mobile Clients (510, 550), along with Enterprise Headquarters (570) and Cloud Datacenter (580) are coupled to the public Internet (590) through Routers 560). In this scenario, embodiments of the present invention support different connections between endpoints (e.g., offices, HQ, mobile devices, Public Clouds, etc.) while guaranteeing different QoEs based on the needs of the clients.

Introduction

Internet Transport Protocols were originally designed with resilience, robustness, and stability in mind. In addition, they operate on a per-link basis since the visibility of each router is limited to its neighbors. Thus, routing decisions are based on local conditions rather than taking into account the status of the entire network. This architectural decision greatly contributes to the Internet scalability but penalizes its performance for other metrics such as throughput and latency.

Models such as the Cloud rely on the public Internet to provide their services, so network metrics have a large impact on overall performance. In addition, new problems arise such as lack of control over the data. Despite these influences, companies are motivated to use public Clouds to exploit factors such as their ease of installation, flexible instances, better cost effectiveness, and availability.

Embodiments of the present invention employ a network solution that provides superior performance using existing public Internet infrastructure. To this end, optimized routing techniques are used exploiting local and global context information over different connection types to ensure a Quality of Experience (QoE) to the final users.

The key technique employed is the utilization of multiple paths to transport information packets in an intelligent way. The capabilities of the aggregated paths include increased throughput, enhanced security, reduced latency, reduced packet losses and greater reliability.

Protocols

A desirable solution for companies facing the scenarios discussed above is to obtain the benefits of a private network but using the public Internet as the underlying infrastructure. This approach would bring a reduction in deployment and management costs. The technique that enables this accomplishment relies in part on the implementation of tunnels. They add robustness, integrity and security to the transported traffic over the public Internet.

Embodiments of the present invention use Virtual Private Network (VPN) to implement tunnels. VPNs are discussed in Internet Engineering Task Force (IETF) Request for Comments (RFC) 2764, incorporated herein by reference. In one embodiment of the present invention, OpenVPN (https://openvpn.net/) is used. In an alternative embodiment, IPSEC implementation is used. IPSEC is described in Internet Engineering Task Force (IETF) Request for Comments (RFC) 6071, incorporated herein by reference.

Embodiments of the present invention use VPN tunnels to transport data in a confidential manner using encryption. In an alternative embodiment, the tunnels are not secure to reduce the computation time required to generate encrypted packets and increase the performance.

Embodiments of the present invention exploit the underlying public Internet infrastructure to its favor. The Internet was designed and works as a packet switching network and in accordance there is potentially a large number of paths between a source and a destination. While embodiments of the present invention utilize tunneling to discover and maintain multiple paths, alternative embodiments utilize other technologies such as connection pooling. Connection pooling consists of maintaining a pool of connections always active, and reusing them to transport application data. The difference between connection pooling and tunneling is that tunnels transport unmodified packets with their headers, while connection pooling transports the payload of the packets, and additional details may need to be sent out-of-band or through a custom protocol. In one embodiment of the present invention, TCP pooling is used to transport TCP data over the Internet.

Multipath Transport allows using a set of different paths without requiring any modification or reconfiguration of the network equipment. That is, Multipath Transport is transparent to the routers. Embodiments of the present invention combine the advantages of Multipath Transport with VPNs to simultaneously transport data over a pre-established and characterized set of tunnels. These VPN tunnels that can carry packets of any protocol that fits the characteristics of the OSI data link layer or above, such as Ethernet, ARP, ICMP, IP, TCP, or UDP, among others.

Many techniques can be defined that can exploit multiple paths, for example replication and dispersion. Replication duplicates the information flows and sends them over through different paths to obtain the best performance. The increased reliability comes at a cost. This technique has a large overhead since the same traffic sent multiple times interferes with each other and congests the routers. In contrast, dispersion breaks an information flow into subflows and sends them over different paths. This technique reduces the congestion but can potentially aggravate the out of order problem. If the paths are used intelligently according to specific requirements of the transported traffic, performance can be increased. Both techniques share a common overhead to create the multiple paths.

Embodiments of the current invention in addition to exploiting the multi-connectivity of the Internet, also tweak VPNs and TCP protocol parameters to improve its throughput and performance in general. For example an embodiment could take advantage of the abstraction provided by the VPN tunnels to simulate a LAN using huge Maximum Transmission Unit (MTU) values (even bigger than Ethernet 9 KB Jumbo frames, e.g. 48 KB MTU); the TCP Maximum Segment Size (MSS) will then adapt to this tweaking allowing for the injection of big frames in the tunnel virtual interface; these huge frames will then be fragmented in multiple IP fragments by routers on the path or by the same physical/virtual host generating them. In this way the TCP congestion control algorithm on the sender will show a faster growth of its sending window value resulting in consistently augmented throughput.

To exploit these advantages, different protocols can be used although TCP and UDP are its main exponents. Embodiments of the current invention transport packets through the tunnels. Tunnel selection and packet scheduling are based on tunnel metrics that match packet prioritization requirements.

MPTCP

Figure 6A:
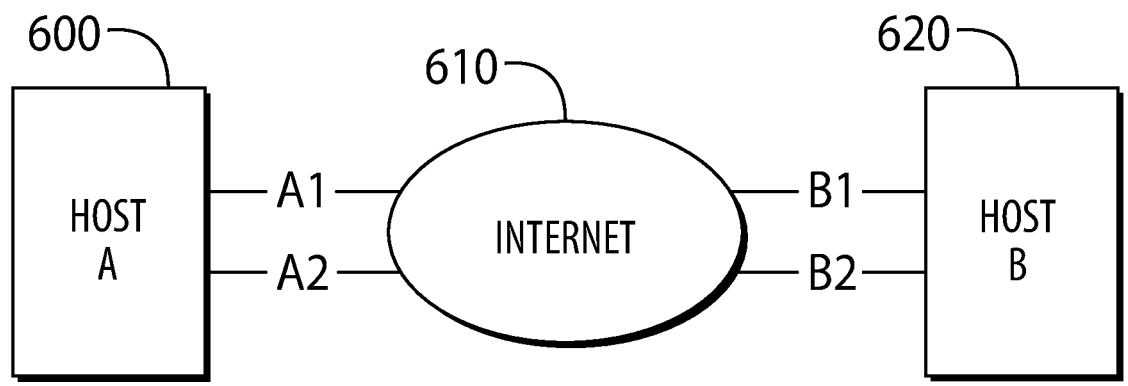
FIG. 6A illustrates a simple MPTCP example.

One approach to Multipath Transport, Multipath TCP, is described in Architectural Guidelines for Multipath TCP Development, described in Internet Engineering Task Force (IETF) Request for Comments (RFC) 6182, incorporated herein by reference. Multipath TCP (MPTCP) is an extension of TCP to enable multiple paths. FIG. 6A illustrates a simple example of MPTCP. Two connections (A1, A2) couple Host A (600) to the Internet (610) and two connections (B1, B2) couple Host B (620) to the Internet (610). Each path from Host A to Host B is uniquely identified by the 5-tuple that consists of: IP source and destination addresses, IP source and destination port numbers, and the protocol used.

As noted above, the paths through the Internet are not necessarily disjoint. For example, A1-B1 and A1-B2 could share a common link within the network, in which case an intelligent selection will prevent congestion and cross-interference.

MPTCP has two major goals: (i) improve throughput through the concurrent use of multiple paths and (ii) improve resilience because segments can be sent over any path. The two objectives are not independent. Node failure is an extreme case in which the resiliency of MPTCP becomes important. In some conditions, MPTCP can outperform TCP. In practice, implementation details must be considered. For instance, the overhead cost of MPTCP may counteract its advantages in the transfer of small files.

When the use of MPTCP is generalized, it may also bring a reduction in the congestion of the overall Internet by shifting away traffic from congested bottlenecks through a better usage of the spare capacity.

Figure 6B:
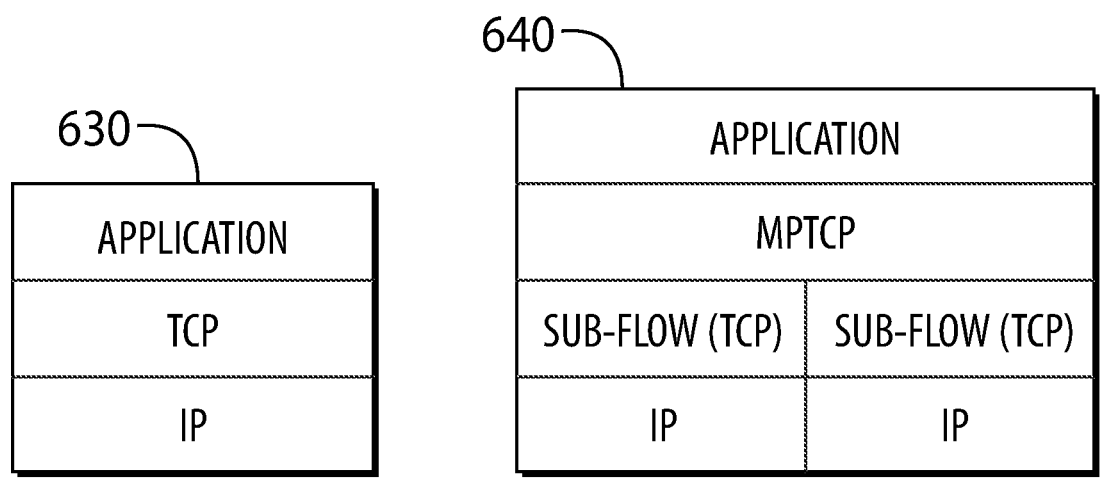
FIG. 6B illustrates a comparison of standard TCP and MPTCP protocols.

An overview of the MPTCP architectural stack is depicted in FIG. 6B. Standard TCP (630) is illustrated on the left and MPTCP (640) is illustrated on the right. The MPTCP layer handles path management, packet scheduling, the sub-flow interface, and congestion control. The sub-flows are standard TCP sessions to give each path the underlying transport. All these details are transparent to the applications.

The reference MPTCP implementation for Linux executes in kernel space. Embodiments of the present invention involve modifications to certain MPTCP kernel modules of the reference Linux implementation. These modules receive commands through Netlink to optimize the MPTCP connections from a process implemented in user space.

In an embodiment, a new kernel module is utilized that improves point-to-point connections between clients (e.g. branch office) and servers (e.g. HQ) instead of using the default full mesh topology. This module reduces the overhead of Multipath Transport through the elimination of unused connections (e.g., between two IP ports of the same device in the same office). In an embodiment, the interface limit of the reference MPTCP Linux implementation has been increased. With this modification, a flow can now use up to up to 32 interfaces, instead of eight, the limit imposed by the original implementation. In alternative embodiments, the maximum number of interfaces and subflows can be greater.

In an alternative embodiment, a full user-space implementation, together with a user-space packet I/O (e.g., DPDK) can be utilized. This embodiment is more efficient than the hybrid kernel-user space solution. It enables control of the protocol implementation and the optimization of performance while reducing the overhead associated with communication from kernel to user space and vice versa. In another alternative embodiment, a full kernel-space implementation could be utilized.

In embodiments of the present invention, new versions of two MPTCP submodules are utilized: the Path Manager and the Packet Scheduler. The path manager decides how many sub-flows to establish. The new versions are able to create and close sub-flows dynamically as well as other modifications described below. The scheduler assigns packets to sub-flows. The new scheduler algorithm balances the load between sub-flows and applications.

Multipath UDP (MPUDP)

UDP is the other major transport protocol. UDP extensions to support MPUDP have not been standardized yet, but the underlying idea is the same: to enable UDP connections to exploit multiple paths simultaneously. Unlike TCP, UDP is not a reliable transport protocol, i.e., it leaves to the application the issues of dropped, out of order and duplicated packets.

MPUDP inherits UDP attributes: unreliable transport, lack of congestion control and packet ordering guarantees. Currently, only three standard transport layer protocols implement unreliable transport: UDP, DCCP and SCTP. Since UDP does not have congestion control, it is used mainly on transfers with low throughput requirements. Depending on the application requirements, different key metrics need to be optimized. For example, in some applications reducing packet loss is very important while in others reducing the one way delay is more important. Multipath can significantly help in this topic. For example, in order to reduce packet loss, the UDP traffic can be migrated to a less congested path. To reduce one way delay, UDP traffic can be replicated and simultaneously sent over several paths. In the latter case, it is important to eliminate replications on the receiver side. This could be accomplished by changing the UDP transfer to a DCCP transfer.

Datagram Congestion Control Protocol (DCCP) implements unreliable transport with TCP-like congestion control (using session hand-shaking and sequence numbers). DCCP is described in Internet Engineering Task Force (IETF) Request for Comments (RFC) 4340, incorporated herein by reference.

Stream Control Transmission Protocol (SCTP) has an extension for Partial Reliability (PR), which prevents retransmission of expired data. SCTP is described in Internet Engineering Task Force (IETF) Request for Comments (RFC) 4960, incorporated herein by reference.

Among these three protocols, only DCCP and SCTP have congestion control, and only SCTP has support for multi-streams and multi-homing (multi-path). Thus, two possible candidates for efficient MPUDP would be multi-path DCCP (manually implementing the path manager and the packet scheduler) or SCTP with Partial Reliability and multi-homing. An approach such as the former is presented in "Packet Scheduling and Congestion Control Schemes for Multipath Datagram Congestion Control Protocol", by C. Huang, Y. Chen and S. Lin, incorporated herein by reference. An approach such as the latter is presented in "Partially Reliable-Concurrent Multipath Transfer (PR-CMT) for Multihomed Networks" by C. Huang and M. Lin, incorporated herein by reference.

In addition, some UDP-based applications are sensitive to packet order, which can be aggravated by multi-path delivery. Both DCCP and SCTP support packet reordering to avoid this problem.

Metrics

Tunnels utilized in embodiments of the present invention are evaluated in terms of network metrics. Some of them are:

Bandwidth (BW): Bandwidth is defined as the theoretical maximum amount of data that can be transmitted in a fixed amount of time. Thus, bandwidth represents the capacity of a network connection for supporting data transfers. Bandwidth is often expressed in bits per second (bps, Kbps, Mbps, Gbps).

Packet Loss: In a packet-switched system, packet loss refers to the number of packets that fail to arrive at their intended destination. The main factors that cause packet loss are link congestion, device performance (router, switch, etc.) such as buffer overloads, software issues on network devices, and faulty hardware. Dropping is the deliberate discard of a packet.

Reliability: Reliability describes the ability of a system or component to function under stated conditions for a specified period of time.

Throughput: Throughput is how much data actually travels through the 'channel' successfully. This can be limited by different things including latency, packet loss, and what protocol is being used. Throughput is usually measured in bits per second (bps, Kbps, Mbps, Gbps).

Latency: Latency is defined as the time since an application generated some data to transmit until such data arrives at the destination application to be processed. Latency in packet switched networks can be affected by many different factors, especially in the operating environment of long distance networks, such as processing delay, buffer bloat and queueing delays.

Jitter: Jitter is the absolute value of the difference between the forwarding delay of two consecutive received packets belonging to the same stream. Jitter results from network congestion, timing drift and route changes. As reported in Internet Engineering Task Force (IETF) Request for Comments (RFC) 3393, incorporated herein by reference, the term jitter in packet-switched networks to identify the variation in packet delay is not completely correct. Packet Delay Variation (PDV) may be a better term to use in this context.

Round Trip Time (RTT): Round-trip time, also called round-trip delay, is the time required for a packet to travel from a specific source to a specific destination and for a return packet to travel back to the source.

Inter Packet Time (IPT): Inter Packet time is the time elapsed between two consecutive packets within a flow. When Inter Packet Arrival Times (IPAT) are compared with Inter Packet Emission Times (IPET), it provides a convenient and efficient way to compute Jitter. Through heuristics it is possible to predict Jitter by only assessing IPAT.

Flow Completion Time (FCT): Flow Completion Time is the time required to perform a successful transaction using a network flow. The type of transaction and its correctness is application-dependent.

Observable Connection Path: The Observable Connection Path is the measurable set of nodes traversed by the constituent packets of a flow (e.g. a persistent tunnel connection between two endpoints).

Certified Starflow™ Paths

An important concept for embodiments of the present invention is the "Certified Starflow™ Path", or CSP. CSPs are persistent connections opened between two endpoints of the network. In embodiments of the invention this persistent connection is implemented by means of a VPN tunnel. Once the connection is opened and kept alive, metrics, such as the ones described above, start being monitored. Once a tunnel passes certain thresholds during a desired interval, the tunnel is promoted to the status of a "Certified Starflow™ Path", or CSP. Similarly, a CSP may be demoted if it fails to maintain certain thresholds for a desired interval. Different algorithms govern the promotion and demotion process according to the desired QoEs required as well as other factors. For example, if a company has a QoE that requires a throughput higher than 10 Mbps, only the VPN tunnels that get over this threshold will get promoted to CSPs. In alternative embodiments, CSPs do not use security or encryption. They may be implemented with any tunneling technique.

A path in a packet switched network such as the Internet can be defined as the set of hops traversed by the packets exchanged between two endpoints. This set depends on the forwarding decisions taken by each hop. Routers in the Internet tend to forward packets belonging to the same flow by uniquely identifying them (e.g., the five tuple as a flow identifier) and maintaining their corresponding routing state while active; this is called flow stickiness.

Embodiments of the invention exploit the dynamic multiple paths offered by the Internet. In an embodiment of the present invention multiple ISPs could be used to connect two endpoints, implicitly providing multiple paths between them as they will be crossing distinct administrative domains. Even with a single ISP per endpoint, traffic flowing between these two endpoints can traverse distinct paths. This is due to some routers on the path having multiple outgoing routes towards the same destination. This multiplicity of next hops can be exploited by routers to load balance traffic thus improving performance and reducing congestion. To avoid breaking connection oriented protocols (such as TCP) in a multipath routing situation, routers also tend to send packets belonging to the same flow towards the same next hop, enforcing flow stickiness. Embodiments of the present invention proactively maintain connections between endpoints, regardless of the agents that established these connections, in a process defined as "Path Fishing".

Discovering CSPs with distinct routes between the same two endpoints depends on how routers enforce per-flow load balancing. To distinguish packets belonging to a specific flow and route them towards the same next hop they usually compute a hashing value over some per-flow invariant fields. An example is the 5-tuple of a UDP/TCP flow packet: IP source, IP destination, port source, port destination and transport protocol identifier. In an embodiment of this invention UDP tunnels are used. Other embodiments could use IPsec or other tunneling techniques. In some cases no source or destination ports are present (e.g. in an IPsec packet working in tunneling mode with an ESP header, which is the most common configuration for IPsec in tunnel mode). In this case other bytes of the header could be used as hashing values together with source IP and destination IP by the routers on the path to maintain a stable path for all the packets belonging to the same IPsec tunnel.

A discovered CSP is characterized based on a set of relevant metrics, the path being one of them. The characterization can be either active or passive. The former utilizes active probes to retrieve the measurements, while the latter gathers the measurements from the actual traffic being transported. Even if multiple CSPs with equivalent paths are discovered, they can have distinct behavior in term of other metrics. The number of CPSs between two sites is dynamic and intelligently managed in concordance with the QoE required.

In one embodiment of the invention, the number of CSPs is limited in part by the number of unique tunnel identifiers. For example, if a 5-tuple technique is used, the number of CSPs from a given source to a given destination is determined by the number of unique 5-tuples that can be established between endpoints.

Figure 7:
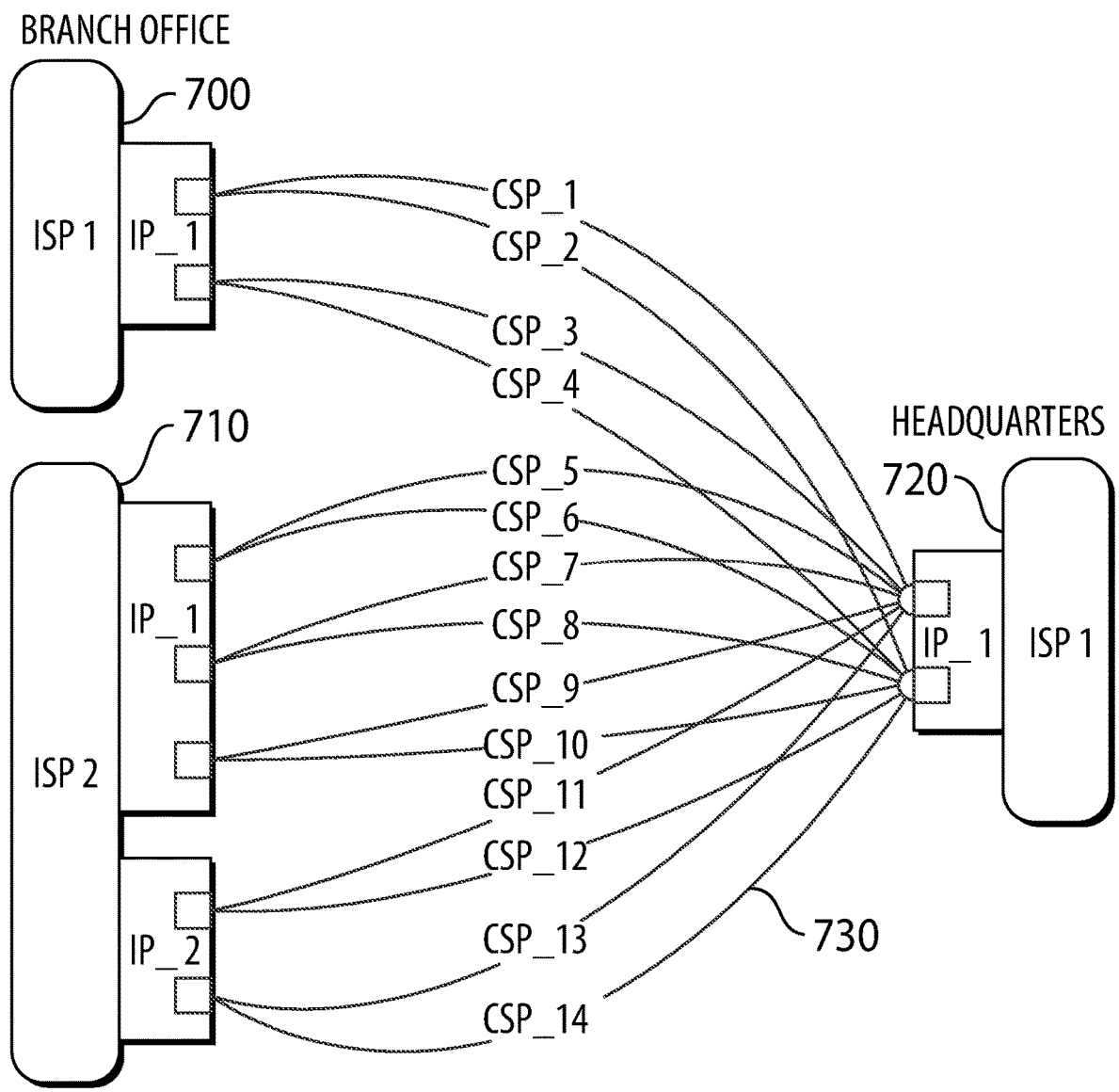
FIG. 7 illustrates an exemplary embodiment of a branch office connected to enterprise headquarters.

FIG. 7 illustrates an exemplary embodiment of a branch office connected to enterprise headquarters. In this example, the branch office has two different ISP connections, one ISP (700) with a single IP address with two transport ports available and the other ISP (710) with two IP addresses with three and two transport ports respectively. On the other side of the connection, the headquarters has a single ISP (720) with one IP address and two transport ports.

On top of this network setup, all the possible CSPs (730) between the locations are also shown. Note that all the CSPs within the branch office are not displayed. Although this is a simple network topology, enterprises may require more complex topologies to interconnect their offices. In consequence, topologies will determine the number of CSPs.

In this example, the IP transport port limitation allows for 14 possible CSPs, which can be expressed as the sum of the total number of IP transport port pairs available at the branch office and the total number of IP transport port pairs available at the headquarters. Thus, embodiments of the present invention can potentially transfer traffic over those 14 CSPs.

While network configurations limit the number of CSPs, the number of flows under transmission depends on users and their applications. Also, the number of flows is limited by the capacity of the CSPs, which is the bandwidth of each connection. Furthermore, flows are divided into sub-flows to enhance the granularity of the system while distributing traffic over available CSPs.

In one embodiment of the present invention, a flow can use up to 32 different CSPs concurrently, where each CSP can handle a subset of the total number of sub-flows of that flow. In alternative embodiments, the number of different CPSs that can be used can be greater than 32. This is illustrated in FIG. 8. A single flow (800) is divided into up to 32 sub-flows (810) and transmitted over up to six CSPs (820).

In one embodiment of the present invention, the original MPTCP protocol is utilized and thus it establishes a full mesh connection between all endpoints. In an alternative embodiment, a point-to-point topology is used to eliminate the overhead of unused tunnels, to increase the number of possible sub-flows, and to overcome limitations on flow to CSP assignments.

CSP Directionality

In one embodiment of the present invention, a CSP is bidirectional as an inherited characteristic from tunnels. Whether both CSP directions use the same network path or not depends on the network infrastructure. For example, for IP-based tunnels both directions do not necessarily traverse the same network path. This results in each direction of a tunnel potentially having different characteristics (e.g., in terms of latency, or bandwidth).

However, some applications and/or protocols may suffer from this asymmetry in the characteristics of both flow directions. For example, TCP connections largely depend on RTT (the combined latency of both directions) to ensure a global end-to-end QoE, due to the protocol's dependency on the returning acknowledgement packets (ACK) before forwarding new data.

In one embodiment of the present invention, each data packet can be transported through the CSP that better fits the characteristics of the application or the policies of the system at that moment. For example, a TCP connection may be initially established through a given CSP, but data packets can subsequently sent through alternative CSPs that reach the same destination with better characteristics such as higher bandwidth. Moreover, the corresponding ACK packets may return through any of these CSPs, not necessarily the same as the data packet, based on other characteristics such as latency. These decisions are dynamic and may change over time and for each packet.

In an embodiment of the present invention CSPs will be classified by means of the metrics described above. In addition, flows will have a set of requirement in terms of those same metrics plus specific characteristics defined by the application opening those flows (e.g., type of traffic, file transfer size, etc.). The system is able to select the CSPs that best optimize the application needs to forward the flow's packets (e.g., low latency CSPs for latency-sensitive applications such as VoIP or CSPs with high available bandwidth for a bulk data transfer).

To classify CSPs, there is a continuous monitoring of the tunnels which dynamically reacts when a tunnel violates some criteria. For example, CSPs may be classified according to their throughput. In a complementary classification, CSPs may be classified according to their packet loss metrics. For example, category A includes the CSPs with a throughput higher than a specific threshold while category B has the CSPs with throughput below that threshold but with low packet loss.

Additionally, classification patterns can associate CSPs with certain types of traffic. For example, if large files are being sent, the desired CSPs should have an excellent throughput. Alternatively, if data reception acknowledgments are being sent, a reduced latency is preferable over throughput. Furthermore, flows can have different priorities according to user and application types. For example, classification can contribute to guarantee those priorities without compromising characteristics such as real-time or even QoE.

Deployment

Embodiments of the present invention are deployed as "agents" that run inside a Virtual Machine (VM) that can be deployed in any device or network equipment. Where the VM is executed determines the source and destination of the CSPs. There are three VM deployment options, which have an impact on system performance: 1. execute VMs at network equipment that connects LANs with the WAN; 2. execute VMs in certain aggregation points inside LANs; and 3. execute VMs in each device inside LANs.

In an alternative embodiment, agents are deployed using containers instead of VMs. Containers are light virtualization mechanisms provided by the operation system, allowing to isolate groups of processes or groups of system resources. For example, in Linux, applications and network devices can be isolated in namespaces.

Figure 9A:
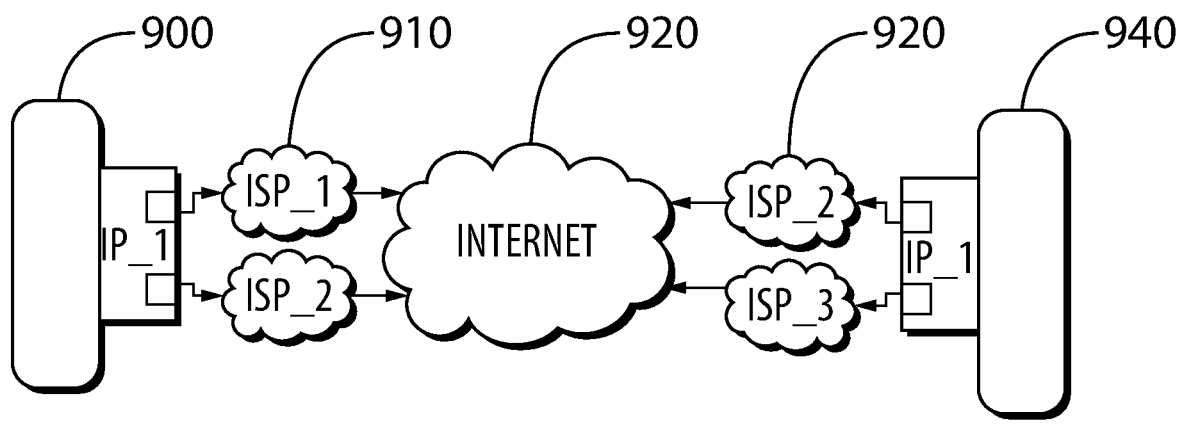
FIG. 9A illustrates CSPs crossing different ISPs and the core of the Internet.

In some cases CSPs may traverse different networks domains (e.g., distinct Autonomous Systems, AS), including routers in the Internet core. In addition, if the third option above is chosen, CSPs will also cross the LANs. FIG. 9A illustrates this situation. One end point (900) having two ISP connections (910) is coupled to another endpoint (940) also having two ISP connections (930) through the Internet core (920). Each CSP starts at one IP/transport-port pair in one of the endpoints and terminates at an IP/transport-port pair on the other.

Where the agents are placed contributes to the total number of CSPs. This decision determines the number of endpoints to be connected. For example, if the first option above is used, deploying the VMs at ingress and egress of the LANs, the number of CSPs may be reduced due to the limited number of CSP identifiers available at the ingress and egress points. This restriction stems from the number of available transport ports publicly open by the endpoint, as there are security concerns regarding opened ports. In contrast, if VMs are deployed at all devices inside LANs the number of CSPs can be larger since more CSP identifiers would typically be available. This choice also has implications in terms of computational capacity, security, and company policies. Running a VM in each device may not be desirable by some companies because they prefer to use a firewall to secure their LANs.

While running VMs on all devices results in an end-to-end QoE, running them in egress/ingress points of LANs may result in performance uncertainties because QoE is guaranteed only between those two points. Furthermore, CSPs inside the company likely share most of their links since the internal routing options are typically limited. This fact can impact performance due to cross-interference and congestion.

The third option discussed above is an intermediate solution between the previous two. Instead of running VMs in all LAN devices, only certain critical aggregation points will execute the VMs. This technique is not as aggressive as the second option and can certify QoEs even within the LAN.

CSP Assignment

The number of paths connecting two endpoints through the public Internet can be very large. The agents are responsible for deciding the proper set of tunnels to be promoted and utilized as CSPs. The selection of CSP to schedule and transport packets is dynamic. This decision process is based on a twofold criteria, the traffic requirements and the CSPs characteristics. The former consists of classifying the type of traffic being transported, while the latter is the result of the proactive monitoring of CSPs. This allows to dynamically adapt the traffic and react to changes in the network. This allows agents to use the CSPs with the better metrics aligned with the traffic requirements, observable path being one of them; for example different CSPs could traverse distinct network paths (both entirely observable) and the system could decide to replicate packets on these distinct CSPs to enhance reliability.

Figure 9B:
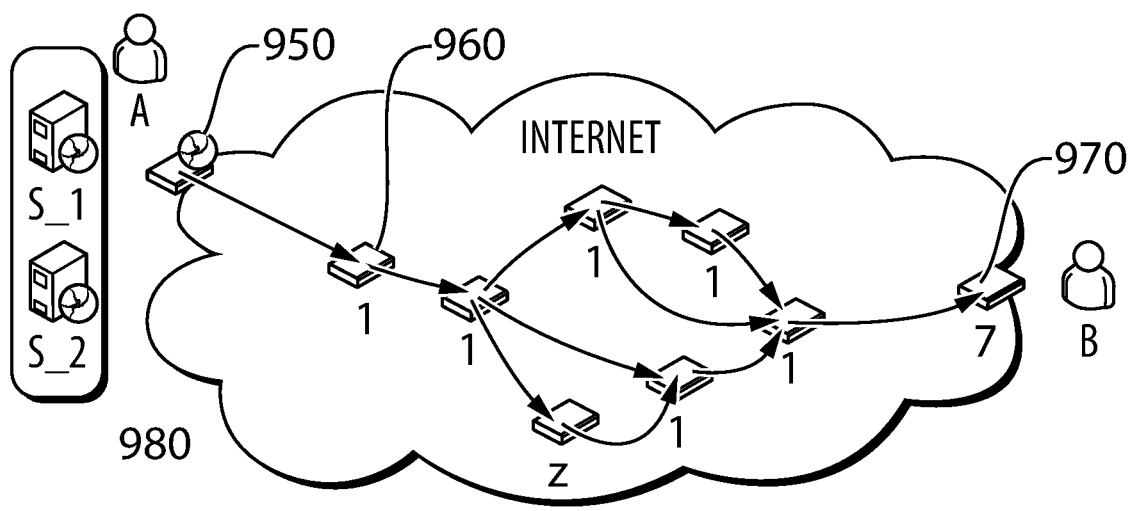
FIG. 9B illustrates different paths over the Internet.

Independently of where the VMs are run, FIG. 9B illustrates the relationship between a set of tunnels and a pool of CSPs. End point A (950) and end point B (970) communicate over the Internet through a set of intermediate routers (960). In this scenario there are four unique paths, shown in the first four rows of the table below.

In addition, different options to run the VMs are illustrated. In one embodiment the VMs are run on endpoint equipment (980), while in another embodiment the VMs are executed only at the exit router of the company (950).

The table below shows six possible paths and the nodes traversed by each:

|        | Nodes crossed |   |   |   |   |   |   |
|--------|---|---|---|---|---|---|---|
| Path 1 | 0 | 1 | 2 | 3 | 5 | 6 | 7 |
| Path 2 | 0 | 1 | 2 | 3 | 6 | 7 |   |
| Path 3 | 0 | 1 | 2 | 4 | 6 | 7 |   |
| Path 4 | 0 | 1 | 2 | z | 4 | 6 | 7 |
| Path 5 | 0 | 1 | 2 | 3 | 6 | 7 |   |
| Path 6 | 0 | 1 | 2 | 3 | 5 | 6 | 7 |

Note that it is possible for two different CSPs to traverse the same route, so it would be possible for an additional tunnel to cross the same nodes as one of the other tunnels. For example, Tunnel 5 traverses the same nodes as Tunnel 2 and Tunnel 6 traverses the same nodes as Tunnel 1. Even when two different CSPs traverse the same nodes, they may have different performance characteristics.

In this example, agents might have one active CSP (Tunnel 1), a standby CSP (Tunnel 2), and a probing CSP (Tunnel 3). One possible set of considered CSPs states and the state transitions are described in detail below. The active management and monitoring of CSPs evaluate each one against certain thresholds and take action accordingly (e.g., remove an underperforming CSP). If the probing CSP does not outperform the active and/or the standby CSP, it can be discarded and that CSP identification (5-tuple) will be reused for another tunnel. Then, this new tunnel becomes the probing CSP to analyze if its performance improves the other two being used. CSP states and the transitions between them are discussed in more detail below.

In one embodiment of the present invention, a pool of CSPs is used where one or more of them are probing CSPs. Therein, performance is evaluated periodically, for example every five minutes. In alternative embodiments the time between measurements could be based on other logic or behavior pattern. To reduce the measurement overhead, passive measurements can be used if real traffic is being transmitted, or active measurements can be used if there is no traffic on those CSPs.

In some embodiments, multiple consecutive tests of a probing CSP/tunnel that does not outperform any of the other CSPs cause the system to discard the CSP and select a better one in replacement. The test criteria for discarding a CSPs may consist in consecutive test distributed in time. In case there are active flows on the CSP, it remains active until the flow is finished but no new flows are assigned to it. This causes a relaunch of the CSP/tunnel with a new 5-tuple, which could be the same as the previous 5-tuple. The new CSP may differ in its source transport port, which now is randomly chosen from the set of available ports at the source. This port modification is performed to minimize the possibility of reusing the same discarded path. Despite this change, it is not guaranteed that the "new" tunnel has different properties than the discarded or active tunnels. For this reason, the agents check whether it has different properties or not.

In alternative embodiments, multiple CSPs are maintained that use the same underlying path. This is due to the fact that different performance can occur for two CSPs even if the network path is the same. These differences can arise from the routers and their queuing, routing and/or internal load balancing strategies.

In some embodiments, agents send keep-alives through an option of the VPN software to maintain the CSP open. This technique generates a network message periodically, for example an ICMP "ping" packet every ten seconds, in case of inactivity, to maintain the tunnel open.

In alternative embodiments, policies are used to determine when to probe new tunnels and guide the promotion/demotion process with dynamic algorithms. They also affect sampling frequencies to test CSPs and which granularity is required to properly adapt to network conditions.

Route Identification

One way to differentiate CSPs is through the path they traverse. In case this information is available, it satisfies another major concern in the public Internet, to gain visibility. Users would like to gain control, or at least knowledge, on which nodes (e.g., set of IP addresses) their traffic traverses. Embodiments of the present invention utilize two different techniques to provide this visibility.

The first method is the "traceroute" technique. This technique sends a sequence of packets with an incremental Time To Live (TTL). When each packet reaches its maximum number of hops in a certain router, those routers return the packet to its source indicating which node they have reached.

For example, the first packet sent has a TTL=1. Once the first router receives this packet, it decrements the TTL by 1. Since the resultant value is zero, this router returns the packet indicating its own address or identification.

The traceroute method is not entirely accurate. First, routers do not have the obligation to answer, and in case they do they may not send the correct information about themselves. They may send a generic answer indicating their ISP or even provide a false IP address. While this can be done on purpose, this is not generally the case. Traceroute anomalies are analyzed and explained in "Avoiding traceroute anomalies with Paris traceroute" by B. Augustin et al, incorporated herein by reference. Traceroute anomalies are generally related to the topology itself or the routers load balancing policies.

Also, the traceroute technique makes an assumption that is not always satisfied in packet-switching networks. One packet can use a certain path but the next one may use a different one. In this case, incremental TTL packets do not provide the router identification within the same path. This fact could lead to potential incorrect link identifications.

In one embodiment an alternative method is used that modifies the traceroute technique in which probes with altered TTL values masquerade as actual traffic of the connection flow we want to trace. Packets are forged to have a 5-tuple equal to the one of the connection flow packets plus a random payload which is fingerprinted to match the routers replies with specific probes. This modified traceroute technique is more reliable than traditional traceroute techniques as it simulates actual traffic flows without using well known or random ports for the probes.

Together with the flow stickiness effect (generally guaranteed even when crossing load balancers), repeatable results in terms of route discovery can be achieved including the detection of route changes over time. However, this technique has drawbacks that affect all tracerouting techniques: (i) NAT addresses rewriting in private networks, and (ii) ISP non-responding when a TTL expires.

A specific drawback peculiar to the modified traceroute technique is the possibility of not receiving any answer from the last hop as the 5-tuple is an actual valid tuple that is forwarded to a listening service on that port (e.g., the OpenVPN service). The tunnel service is then smart enough to drop the packet as it does not follow the internal protocol requirements; yet the ICMP time exceeded message for that specific probe is not generated. For this purpose, the tool keeps sending probes after not receiving any answer incrementing the TTL value for some time before quitting and concluding that the end of the connection has been reached. Alternative techniques for route discovery are possible and in alternative embodiments, other route discovery mechanisms are used.

Once a technique that can provide information about the network nodes traversed along a tunnel is established, the information including the set of nodes can be maintained, and other metrics of interest for each path can be collected. Thus, instead of managing large CSP pools, a reduced set of CSPs can be used. This optimization results in a reduction of the overhead due to a CSPs management simplification.

CSP States

Network fluctuations affect the performance of CSPs, which prevents a static configuration when agents are initialized. Rather, CSPs need to adapt to continuously changing Internet conditions. To address this issue each CSP has a set of possible states that reflects different situations based on CSP roles and their metrics (e.g., throughput, latency, etc.).

Figure 10:
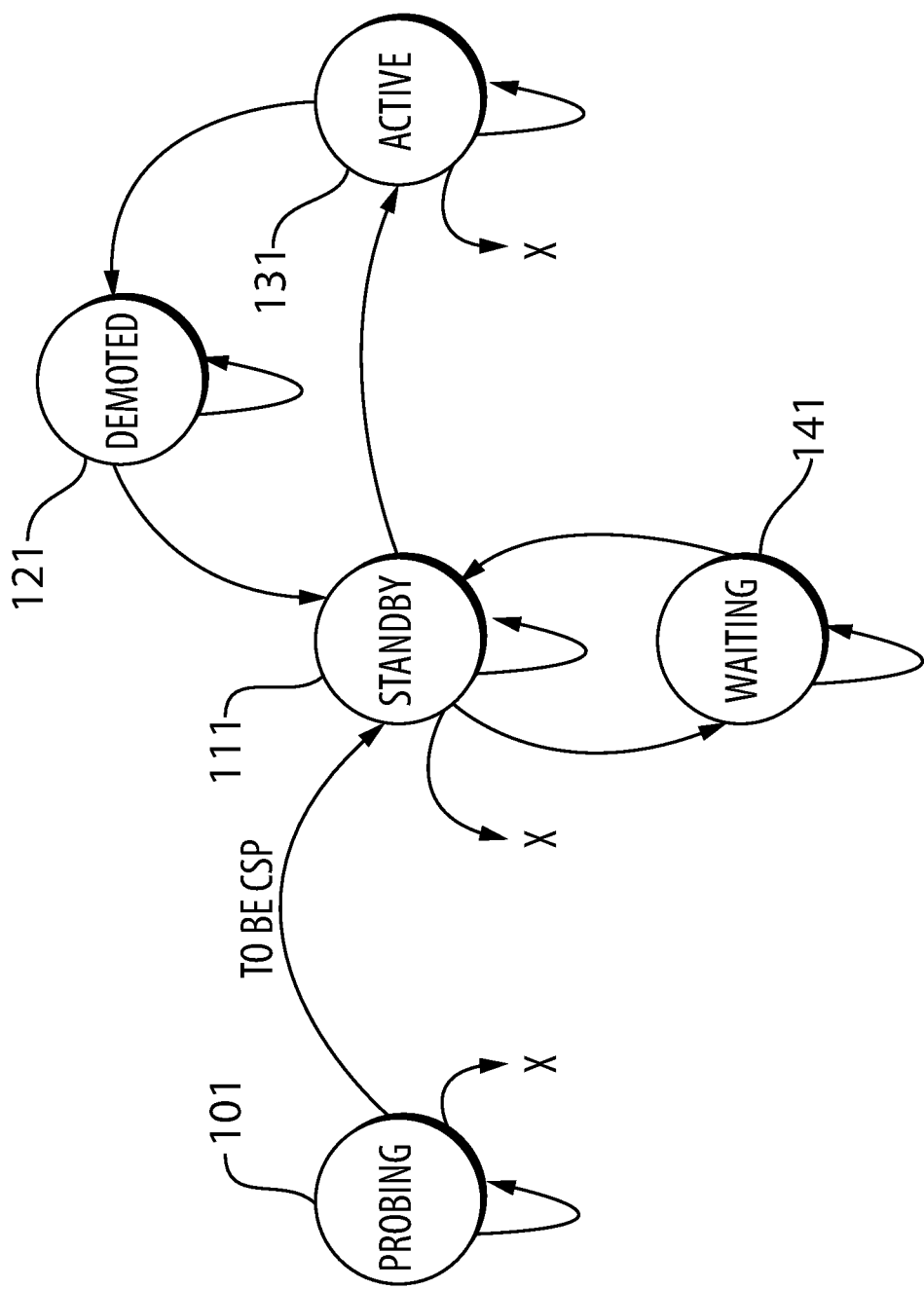
FIG. 10 illustrates the CSP state diagram.

While to the final user the system is stable, the set of CSPs used is dynamically changed to maintain the desired QoE. FIG. 10 illustrates an example of possible states of a CSP. One embodiment uses five states: active (131), standby (111), waiting (141), demoted (121), and probing (101). Other embodiments can modify these states, for instance removing the waiting state. The state diagram shown in FIG. 10 represents the transitions between those states. These states are described in detail below.

Active: This is a CSP that can send or it is currently sending traffic.

Standby: This CSP state implies that it is qualified to be used if promoted to active. This promotion is based on the CSP metrics (bandwidth, latency, etc.). Once promoted, the standby CSP becomes Active. A Standby CSP can also be eliminated if its quality violates a specific criterion.

Waiting: CSPs that remain open and that can be promoted to standby in case that their performance goes over certain limits or if more resources are required. For instance, a waiting CSP may have high performance sometimes and poor performance during other periods.

Demoted: once an active CSP degrades, it goes to the demoted state. This state implies that the system cannot assign new flows or traffic to that CSP. Moreover, there are different options for handling ongoing traffic over a demoted CSP. For example, an aggressive option would consist of cutting the CSP and letting TCP handle the packet loss (for packets that were being transmitted or on the buffers). Another option would implement a soft transition between CSPs without losing packets. This option lets the ongoing packets to be sent and then the CSP is demoted completely.

Probing: Probing CSP is a tunnel under analysis (according to the network metrics of interest) prior to being promoted as a valid CSP or being eliminated.

Deleted CSPs are not considered a state since everything related to them is erased. The crosses in FIG. 10 represent elimination of a CSP.

The conditions that determine the different state transitions depend on network metrics including throughput, latency, and packet loss. In some embodiments of the present invention, these transitions are static and manual. In alternative embodiments, the process is automated, taking into account more metrics.

Agents manage a queue for each state that contains CSPs IDs. When an agent requires a new CSP to transmit, it goes to the active queue and selects the CSP ID with the desired metric. In addition, priorities can apply to these queues to optimize the CSP selection process.

Flow to CSP Assignment

Policies specify the maximum number of sub-flows from a given flow and the number of CSPs it can use. On top of these parameters the flow to CSPs assignments are implemented to optimize performance.

In one embodiment, when a new flow arrives to the VM, it is divided into as many sub-flows as the number of active CSPs. Then, one sub-flow is sent through each active CSP. This process is static and it is done each time a new flow arrives at an agent.

In alternative embodiments, a dynamic flow/sub-flow division based on traffic characterization, and network condition is utilized. A dynamic solution has advantages because one flow division and CSP assignment may have a good performance at a certain moment but a poor performance in another time. In some embodiments the number of sub-flows is variable and the CSP assignment can change dynamically. CSPs are dynamic as well and the dynamic assignment can depend upon application type, time of day, type of users, etc.

Architecture

Figure 11:
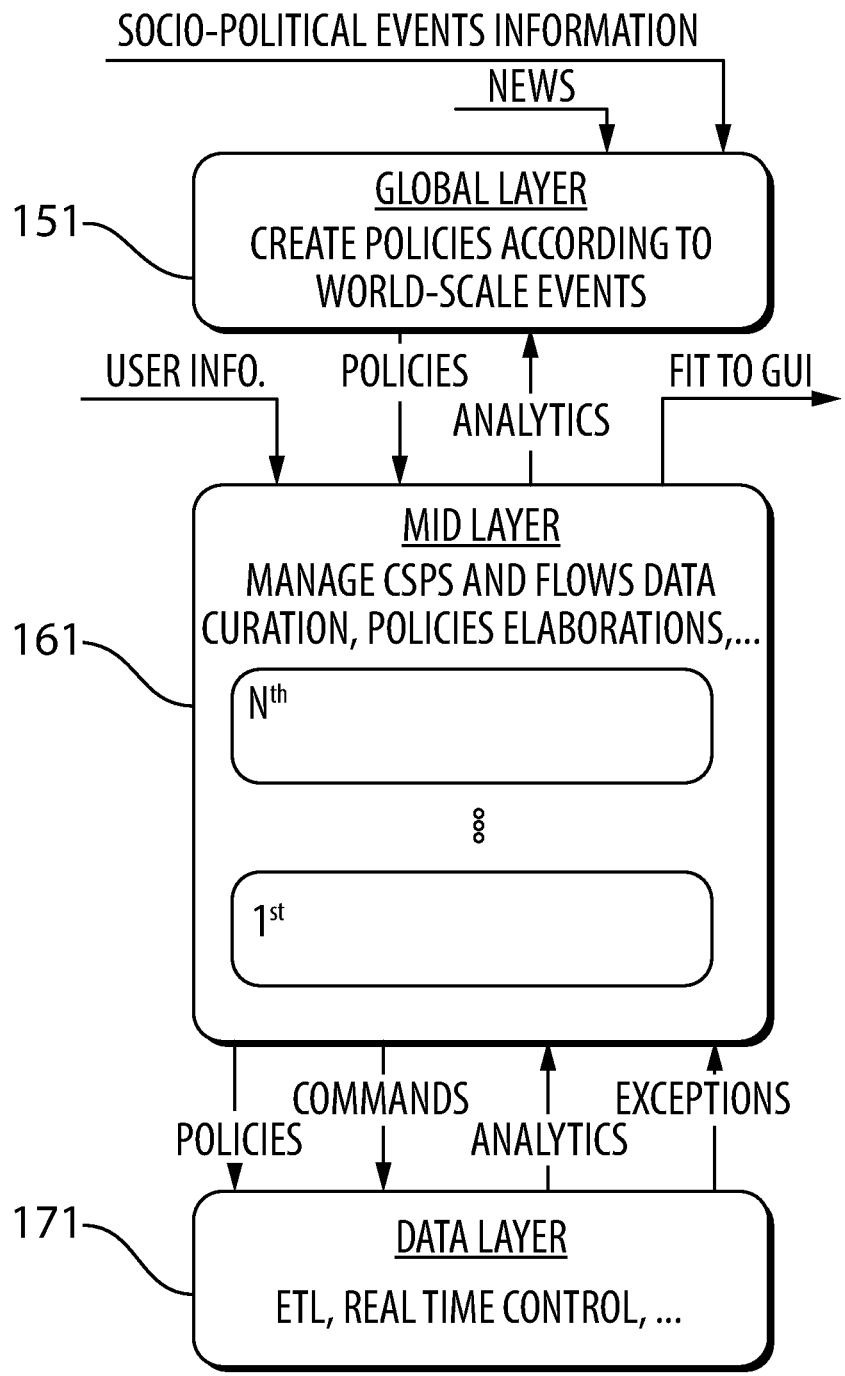
FIG. 11 illustrates the three-layer CSP management architecture.

Managing large numbers of CSPs between different endpoints, adapting flow to CSP assignments to network conditions, and guaranteeing end-to-end QoE is a significant task from scalability and complexity perspectives. This management includes acting upon real-time information such as network status (e.g., congestion, failures, etc.), cross-traffic interference, and dealing with the stochastic nature of the public Internet among others. A hierarchical architecture has been defined to tackle these problems. FIG. 11 illustrates this architecture. One embodiment uses a three layer hierarchical system where the top layer is the Global Layer (151), the middle layers are the Mid Layers (161) and the lowest layer is the Data Layer (171). At the bottom of the architecture there is the data level that manages information, measurements and packets. Above the data level is the mid-level, which can be decomposed into different sub-levels to manage multiple levels of aggregations. Their scope encompasses Local Contextual Information (LCI) including enterprise requirements (e.g. departmental division, user policies, etc.), and network topologies (e.g. number of ISPs, ports, etc.). This level handles policies that includes rules for CSPs and flow to CSP assignments based on LCI. At the top of the architecture there is the global level, dealing with world-scale events such as socio-political situations, catastrophic disasters, sport games, etc. This Global Contextual Information (GCI) is used to generate policies to guide lower levels. Interfaces handle communications and exchange of information between these levels. A key characteristic is the semi-independent regime of operation. In case the data layer gets disconnected from the upper layers, it can continue operating based on the information it has available.

Embodiments of the present invention have distributed learning algorithms in each layer to optimize their functionalities exploiting their different contextual information. The fact that each layer deals with different type of information contributes to provide a scalable solution for guaranteeing QoEs over the public Internet.

The higher the level, the higher the abstraction and the scope of the system but the coarser the granularity. These levels also reflect different time scales. The Data level can operate in real time but mid and global levels do not. These different regimes of operation result from a distributed architecture with agents (data level) running at endpoints and mid and global levels running on-premises or in the Cloud.

Single Enterprise Perspective

When an enterprise wants to guarantee end-to-end QoEs using embodiments of the present invention, deploying agents at their offices is the first action. The combination of these agents results in implementation of the data layer. Each agent is responsible for managing CSPs and assign flows to them based on a set of policies.

Figure 12:
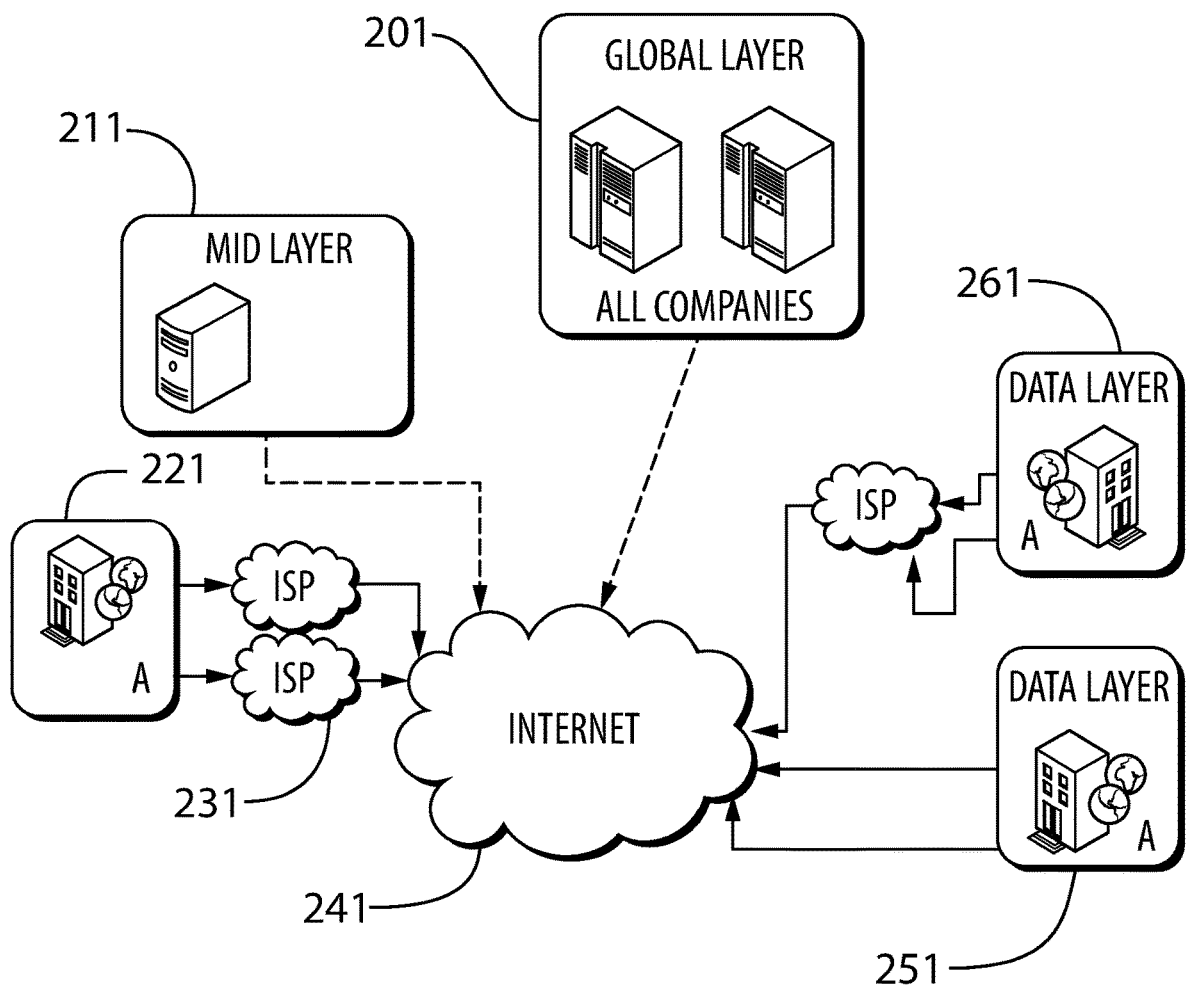
FIG. 12 illustrates the system architecture from a single enterprise perspective.

These policies are an output of the mid layer that generates them based on LCI. Simultaneously, the mid layer receives policies from the global layer that takes into account GCI. In this case with a single enterprise, mid and global layers are dedicated to ensure their QoEs. FIG. 12 shows this situation. Agents employing the Data layer (221, 261, 251) at enterprise endpoints are coupled through ISPs (231) to the public Internet (241). Mid layer (211) and Global layer (201) are also coupled to the public Internet (241) and communication with each other and with the Data layer (221, 261, 251).

Global Perspective

Embodiments of the present invention for the data layer is replicated for each client together with part of the sub-layers inside the mid-level. The global level is shared among all customers to exploit the joint analytics and traffics. Despite aggregating information, each enterprise domain is isolated to ensure security and privacy of their data and communications.

Figure 13:
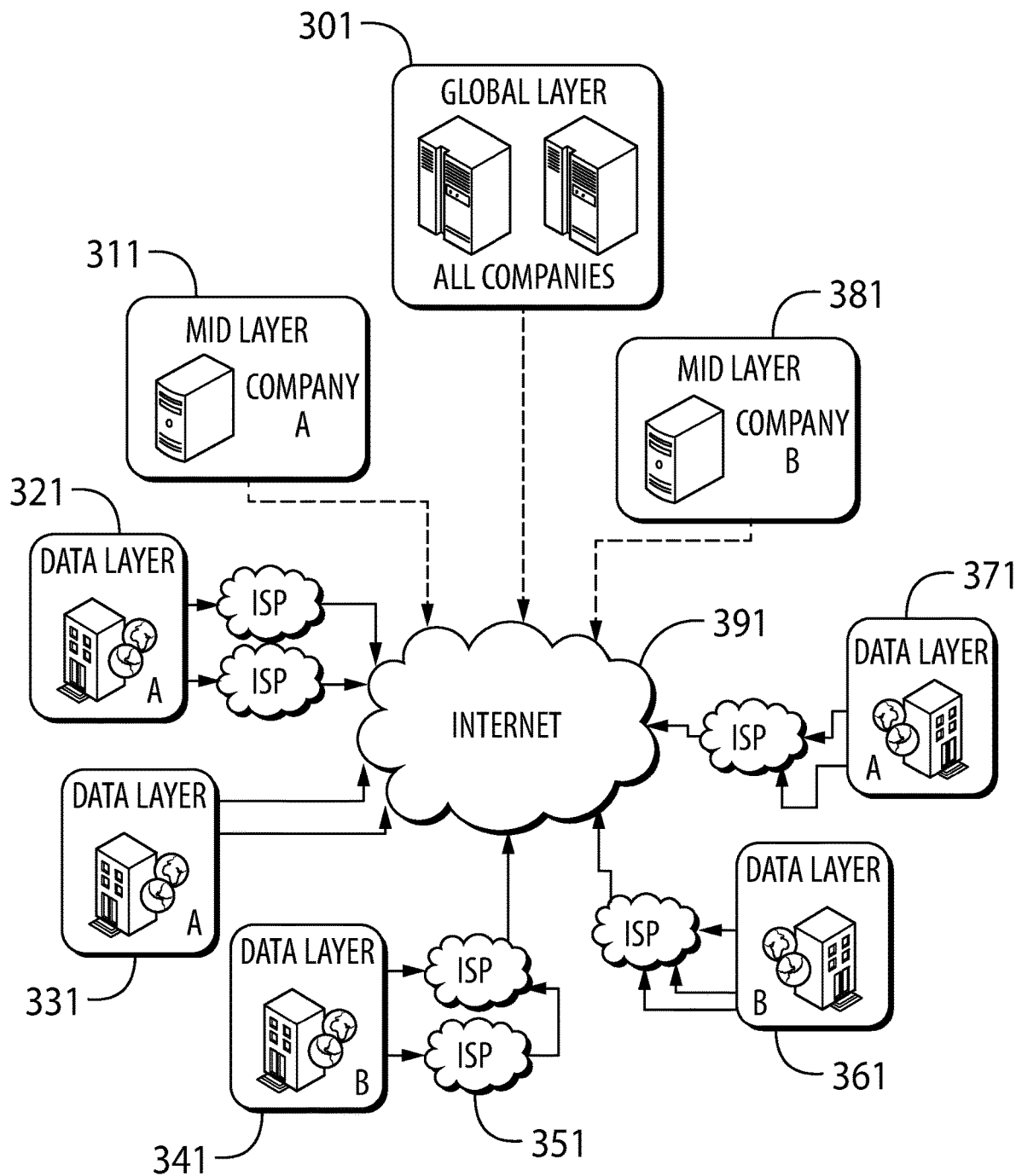
FIG. 13 illustrates the system architecture from a global perspective with two different enterprises.

A global perspective of the architecture is presented in FIG. 13. Agents employing the Data layer at a first enterprise "Company A" (321, 331, 371), and a second enterprise "Company B" (341, 361) are coupled through ISPs (351) to the public Internet (391). Mid layer for Company A (311) and for Company B (381) and Global layer (301) are also coupled to the public Internet (391) and communication with each other and with the Data layers (321, 331, 371, 341, 361).

In this case, there are two enterprises. Each office has an agent to establish and handle connections with other offices. These agents receive policies and commands from their respective mid layers, which run on the cloud. At the same time, mid layer software receives policies from the global layer that takes into account the GCI. Global layer software may run on distributed Clouds around the world.

In this illustrative example only offices within the same enterprise can connect between them. In alternative embodiments, more complex solutions to interconnect offices from different enterprises are implemented. This topology could result in increased complexity of the policies. Different sub-layers within the mid-level can be configured to handle this complexity generating policies adapted to a specific scenario.

Figure 14A:
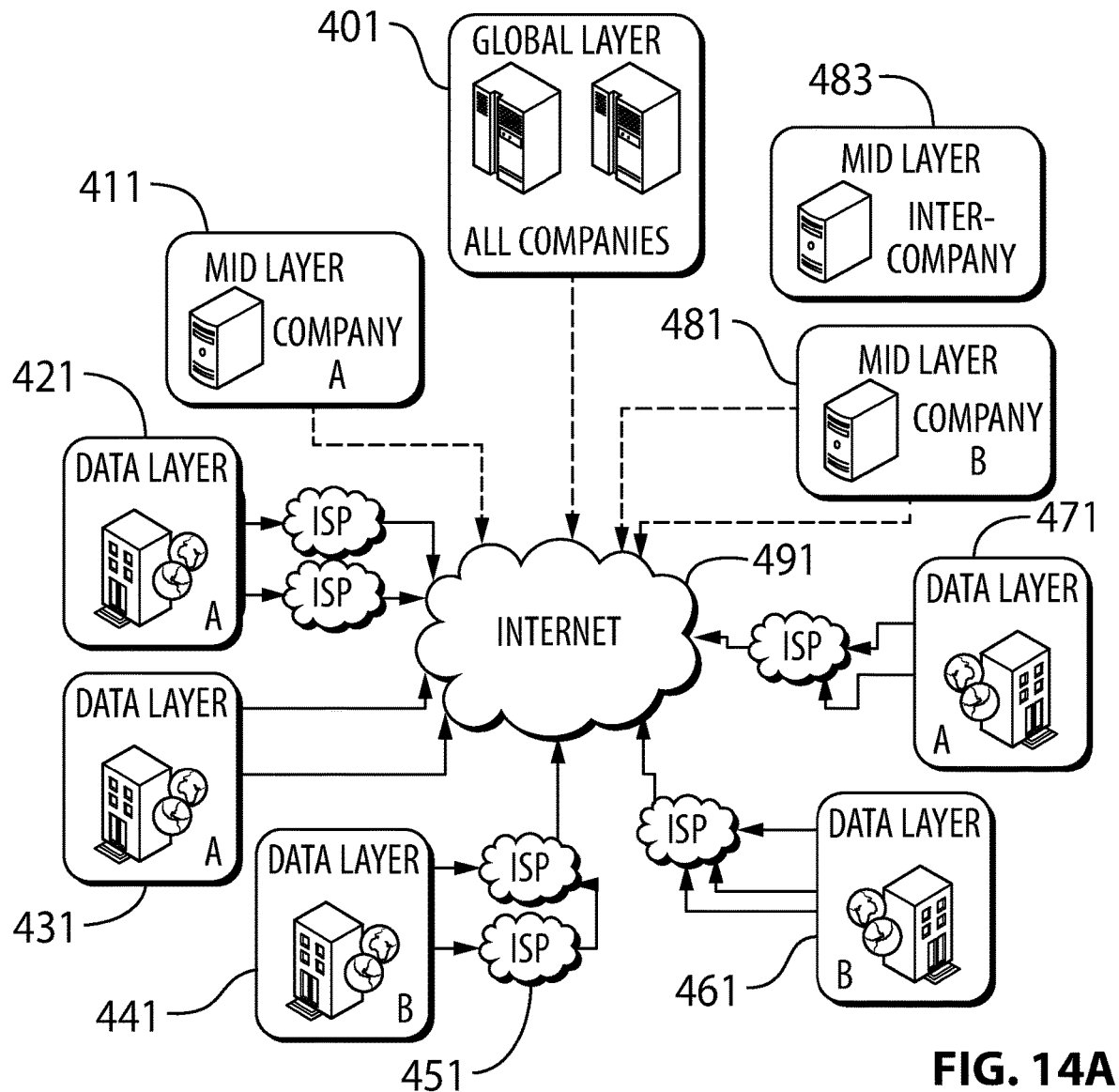
FIG. 14A illustrates the system architecture from a global perspective with two different enterprises including an inter-enterprise mid-layer.
Figure 14B:
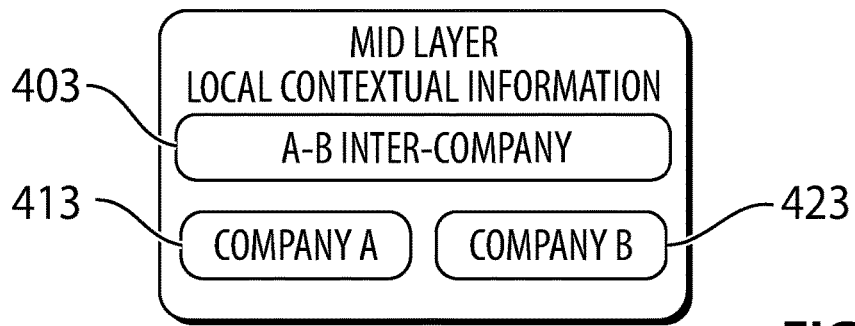
FIG. 14B illustrates a more complex mid layer having a specific sub-layer for each enterprise plus a combined sub-layer.

In an alternative embodiment, a higher sub-layer to handle inter-enterprise connections is used on top of specific mid-level sub-layers for each enterprise. This configuration is illustrated in FIG. 14A and FIG. 14B. Agents employing the Data layer at Company A (421, 431, 471), and Company B (441, 461) are coupled through ISPs (451) to the public Internet (491). Mid layer for Company A (411) and for Company B (481), in addition to an inter-enterprise mid-layer (483) as well as Global layer (401) are also coupled to the public Internet (491) and communicate with each other and with the Data layers (421, 431, 371, 441, 461). Conceptually the three mid-layers can be viewed as an A-B inter-company layer (403) on top of a Company A mid layer (413) and Company B mid layer (423). In this situation the mid-level has two different sub-layers.

One advantage of creating different sub-layers inside the mid-level is to exploit locality-awareness and joint characteristics between enterprises. A policy designed by combining LCI from different enterprises can result in improved performance. Both mid-level sub-layers and global layer run on the Cloud. The layered architecture deals with the complexity while being totally transparent to the end-user.

Data Layer

The data layer deals with packets and flows, accessing and acting upon the user data. This layer has two major components, data plane and control plane. The data plane is in charge of forwarding the packets based on a set of switching and routing policies. This plane handles the flows and their corresponding sub-flows. Also the data-plane is the place for traffic shaping and priorities. In contrast, the control plane focuses on managing CSPs, flows to CSP assignments, sub-flow policies enforcement, and learning algorithms.

A key task is the measurement and collection of CSP metrics. Embodiments of the present invention collect a set of metrics as described above, which include bandwidth, packet loss and latency. The purpose of these analytics is to monitor the performance of the system in real-time, and make decisions to maintain and improve the QoE.

An important functionality is the Extraction, Transformation, and Loading (ETL) of several network metrics and key performance indicators (KPI). In an embodiment of the invention, all of this data is curated and then sent to the mid layers based on its granularity. Ideally only strictly necessary information goes from one layer to the other.

The frequency of these inter-layer communications can follow a periodic distribution. For example, each second a set of data could be sent from data layers to mid-layers. The value of this interval becomes crucial to enable a responsive system and not jeopardize its scalability. A shorter interval gets a finer granularity at a cost of a huge overhead both in processing and transmission efforts. A long interval avoids that cost but reduces the reaction time. Thus, there is trade-off between accuracy and resource usage to control the system's granularity. In this embodiment, an interval for data layer to mid-layer communication is approximately one second. In alternative embodiments, other intervals are implemented.

In one embodiment, ZeroMQ, which is a high-performance asynchronous messaging library, and MessagePack, which is a computer data interchange format, enable this inter-layer communication. In addition, embodiments of the data plane support Message Queue Telemetry Transport (MQTT), which is an ISO standard publish-subscribe-based lightweight messaging protocol for use on top of TCP/IP.

An exception (event-based) mechanism is utilized to improve the reaction time. When the data layer detects an abrupt change in a CSP, it sends an exception to the mid layers outside of the interval-based communication. This exception will trigger different events in the mid layers that will decide how to react to such variations. This technique improves the system scalability while enhances its reaction time to manage unexpected changes with a small overhead. This feature reinforces the transparency towards end-users and applications.

Besides monitoring tunnels and CSPs, the data layer is also responsible for executing the tasks required to distribute flows across different CSPs. This function includes encapsulation of packets, optional encryption, and the execution of fork/join operations over the flows to enable Multipath Transport.

In addition, the data layer measures characteristics of physical or virtual interfaces such as available bandwidth, packet loss and latency. In parallel, the data layer performs basic operations over tunnels and CSPs. For example, the data layer is responsible for keep-alive messages that maintain CSPs open, independently of the CSP state. The same principle applies to tunnels. If no traffic is sent over them, either the tunnel becomes a CSP or the tunnel is discarded.

The description above relates to the different functionalities of the data layer and what it sends to the mid layer. In the opposite direction, the mid layer sends policies for the data layer to enforce. A policy is the mapping of an information state into an action. Given the state of the system, policies determine which CSPs can be used to send what type of traffic and how traffic is divided into subflows along with other functionalities. A policy also triggers the transitions between the different CSPs states (e.g., a CSP goes from active to standby), as well as the promotion/demotion of tunnels to CSPs. Policies also control different events such as way to capture data.

In an embodiment of the present invention, CSPs come in forward-return pairs. While the forward and return paths need not be congruent, they are not chosen independently. Hence, the choice of a CSP should be a joint responsibility of the head point (source) and tail point (destination). The critical information is still local (mostly concerned about access congestion at the ingress and egress links), but it is local at the two endpoints (or more, if the communication includes other destinations). This justifies why the CSP choice be made at the mid-layer. In both cases, the mid layer acts a broker to take decisions affecting different agents.

In addition to policies, the mid layer can also send a command to promote a specific tunnel to a CSP based on the analytics the data layer has sent or to request a specific metric. Upon the reception of commands, the data layer executes the desired action. Another example command is probing a tunnel. Thus, the data layer observes all the CSPs regardless of their state, but to act upon them requires the policies from the mid layers. The control in this case is off-loaded from the data layer due to scalability issues.

Policies can have different degrees of freedom that the data layer can exploit. For example, a policy may indicate that only CSPs with a throughput greater than 10 Mbps can be used. In this situation, the data layer can decide which of the CSPs that fulfill this condition are used. In some embodiments, strict policies are utilized that act as control algorithms based on conditional statements. In another embodiment, more flexibility is allowed by the mid layer policies. An intelligent algorithm can exploit those degrees of freedom to optimize performance. For example, a machine learning algorithm may be used to exploit the reactive information (i.e., tests on each CSP) to decide over which CSPs the data is sent, while still keeping within the mid layer policies.

In one embodiment of the present invention, all of the functions of the data layer run on a Virtual Machine (VM) at agents located at each endpoint. One VM can manage the set of physical ports in one endpoint. The data layer is important because it constitutes the foundations of the overall architecture. Multipath optimizations and learning algorithms are built on top of the data layer.

In summary, in a preferred embodiment the data layer performs the following functions: 1. Measure metrics over CSPs and tunnels on an interval basis; 2. Curate the analytics; 3. Keep CSPs alive; 4. Execute mid layer policies and commands; 5. Real-time control operations; and 6. Application decoding and classification (may be controlled by policies).

In a preferred embodiment, the data layer has the following inputs: 1.Mid layer policies; and 2. Commands for tunnel, CSP, and flow management, and the following outputs: 1. Curated analytics (CSPs and tunnels) such as RTT, one-way delay, throughput, capacity, and traceroute; and 2. Handle exceptions in case of extreme situations (e.g., sudden loss of certain capabilities such as available BW).

Some of the embodiments of the data layer are composed of the following modules: 1. Sub-flow manager; 2. Application classifier; 3. Network controller; and 4. Report agent. In alternative embodiments, the data layer also implements machine learning algorithms to exploit the degrees of freedom allowed by the mid-layer policies and discovers new network metrics and relations among each other.

Mid Layers

The mid layer is the layer that understands and controls the system from each company's perspective. In one embodiment of the present invention, this information includes details about the ISPs, physical interfaces, IP addresses, transport ports, topologies, etc. This information encompasses what is referred to as local contextual information (LCI). In addition, LCI includes priorities between different applications, application and flow categories to create patterns guiding new policies, and information about cross-traffic among other things. Thus, the scope of this layer creates the picture of the system inside each enterprise.

The mid layers also tell the data layer to probe different tunnels passing a tunnel identifier. Once the data layer sends back the network measurements, the mid layers can decide whether to promote or demote them to CSPs through policies or commands. Then, these orders are sent back to the data layer that executes the desired policy or command. Other commands can include measuring available bandwidth, latency, transition between CSPs states, modify the frequency to perform ETLs in the data layer, and define policies using local contextual awareness (enterprise-level).

In addition, the mid layer has as inputs application and user requirements that guide policies in combination with curated analytics. Since the mid layer is a logical layer, it does not see flows or application data. In some embodiments, network configurations (transport ports, IP addresses, interfaces, etc.) are entered in this layer through a GUI by IT personnel in each enterprise. In alternative embodiments, this information is the result of a self-discovery process.

As outputs to higher layers, the mid layer sends information to the global layer about performance bottlenecks due to unexpected situations and the status of the connections (from all the mid-level sub-layers). Status tests and data analytics are curated again before going to the higher level to reduce the granularity while gaining abstraction to have a better scalability. In the opposite direction, the mid layer receives policies from the global layer and commands. Since these rules come from higher layers, they are more abstract such as: do not use the network paths that cross over a certain country to avoid a political situation. The relationship between data layer, mid layer and global layer can be analogized to a military organization. Soldiers (data layers) receive orders form captains (mid layers) which at the same time follow orders from generals (global layer). The higher the layer originating a policy, the fewer granularities it has but more priority to be guaranteed by lower levels.

Machine learning algorithms can exploit local contextual information (LCI) to dynamically adapt or create new policies that improve the performance of the solution. The degrees of freedom left by the global layer policies determine the improvement areas for the mid layer. This reveals that the learning architecture also follows a hierarchical structure according to the information available in each layer.

In a preferred embodiment, the mid layers run on the Cloud, not on the agents. Different sub-layers can form the mid layers, which are also organized in a hierarchical way. The number of sublayers will depend upon the contextual information to handle, the amount of intelligence to implement, and enterprise relations among others.

In summary, in a preferred embodiment the mid layer performs the following functions: 1. Handle the view of the system (company-wise); 2. Manage the CSPs and tunnels; 3. Send policies and commands to the data layer; 4. Execute policies and commands from the global data layer; and 5. Collect and process measurements from the data planes and lower mid layers.

In a preferred embodiment, the mid layer has the following inputs: 1. Policies from the global layer; and 2. Curated data analytics from the data layer, and the following outputs: 1. Curated data analytics to the global layer; 2. Policies and commands to the data layer; 3. LCI; and 4. GUI user data.

In alternative embodiments, the mid layer utilizes machine learning algorithms to dynamically create the policies and classifies traffic patterns.

Global Layer

The global layer has a total view of the system including all enterprises, the global public Internet and external factors such as socio-political events, news, etc. Thus, the contextual information inside this level is global contextual information (GCI) since it goes beyond the focus of a single enterprise as for the mid layers.

The global layer guides its policies and decisions also according to curated analytics received from the mid layers. These policies leave room for optimization in the lower layers with the constraints of its rules and their degrees of freedom. An example of a global policy would be: not to use certain country links, avoid congestions due to a sports event or use CSPs that go through an area that is having low utilization because it is a holiday or night time.

In summary, in a preferred embodiment the global layer uses the following inputs: 1. Curated analytics from the mid layers; 2. External information about socio-political events; and 3. Crawling for information, and has the following outputs 1. Policies and commands to the mid layers.

In alternative embodiments, the global layer applies machine learning to create the policies dynamically and establishes relations between world events and network metrics.

Learning

The system architecture composed of different levels has been described above. Also noted above was the fact that in each level some embodiments employ learning algorithms that exploit the information available to take better decisions, optimizing the performance of the overall system. Below the learning in each level is described including its main tasks, inputs and outputs required, and their final objectives.

The learning solution for this embodiment is applied in three different layers: (i) data layer, (ii) mid layers, and (iii) global layer. These three layers translate into three different stages of learning. Starting at the data layer, there is a reactive phase based on the information about CSPs and packets being transmitted. At the mid layers there is a local phase which relies on LCI such as cross-traffic within an enterprise. Lastly, at the global layer there is a global phase that deals with traffic flows with higher abstraction (e.g., traffic out of one country).

Figure 15:
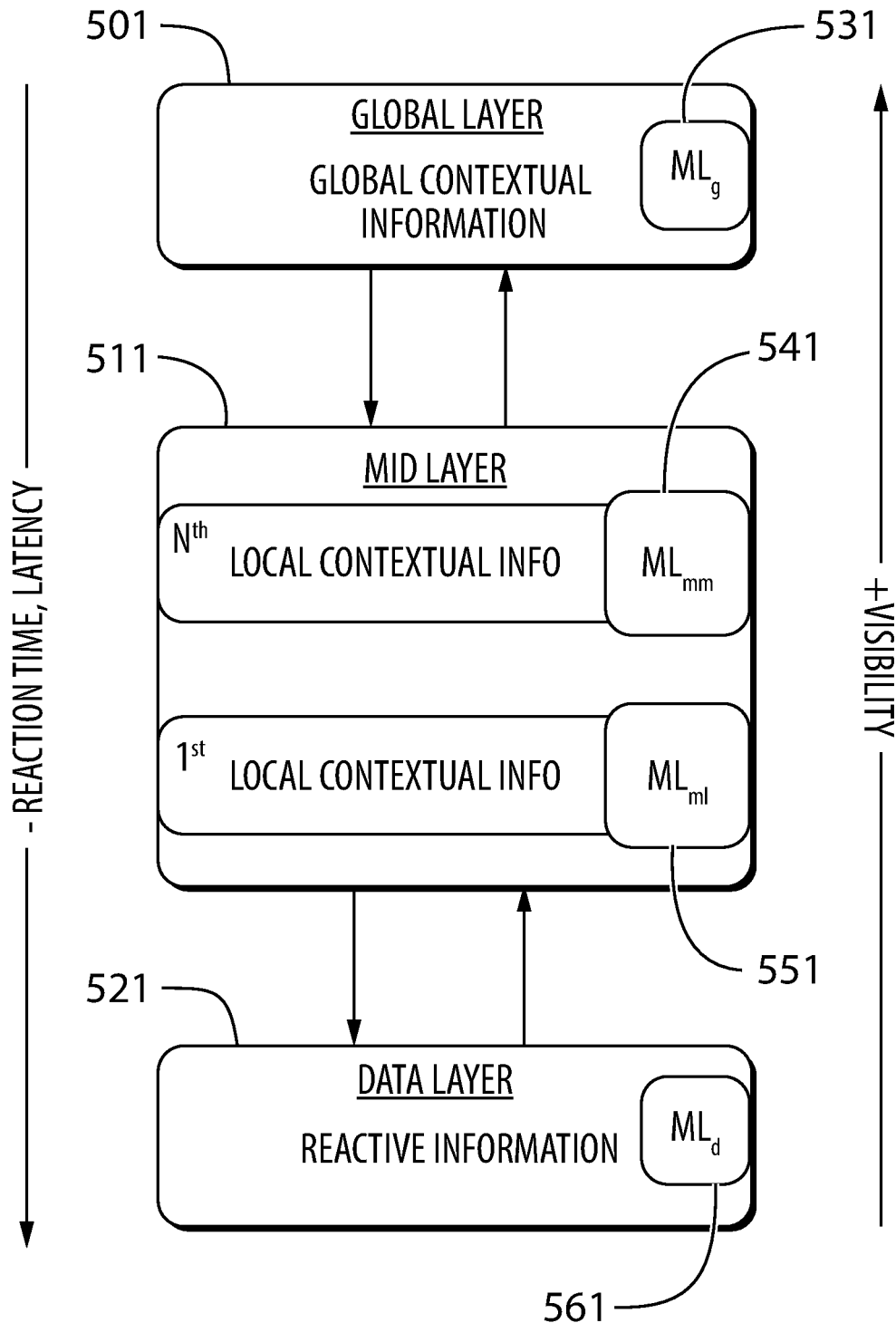
FIG. 15 illustrates learning components inside the architectural layers.

Higher layers have a better visibility at a cost of larger latencies, degrading their real time capabilities. FIG. 15 illustrates these different phases within the architectural framework. Global layer (501) with learning module (531) is coupled to mid layer (511) with learning modules (541, 551) which is in turn coupled to data layer (521) with learning module (561).

An advantage of decomposing the learning in these three levels is to provide an Internet-scale solution through different time and abstraction regimes. Embodiments of the present invention benefits from the different infrastructure capabilities in each architectural layer, from agents at the bottom layer to the Cloud in the mid and global layers. Thus, when the system faces real-time constraints workloads can be executed at the data layer while larger sets of non-critical data are processed in the Cloud where the capacity is less of a problem.

Figure 16:
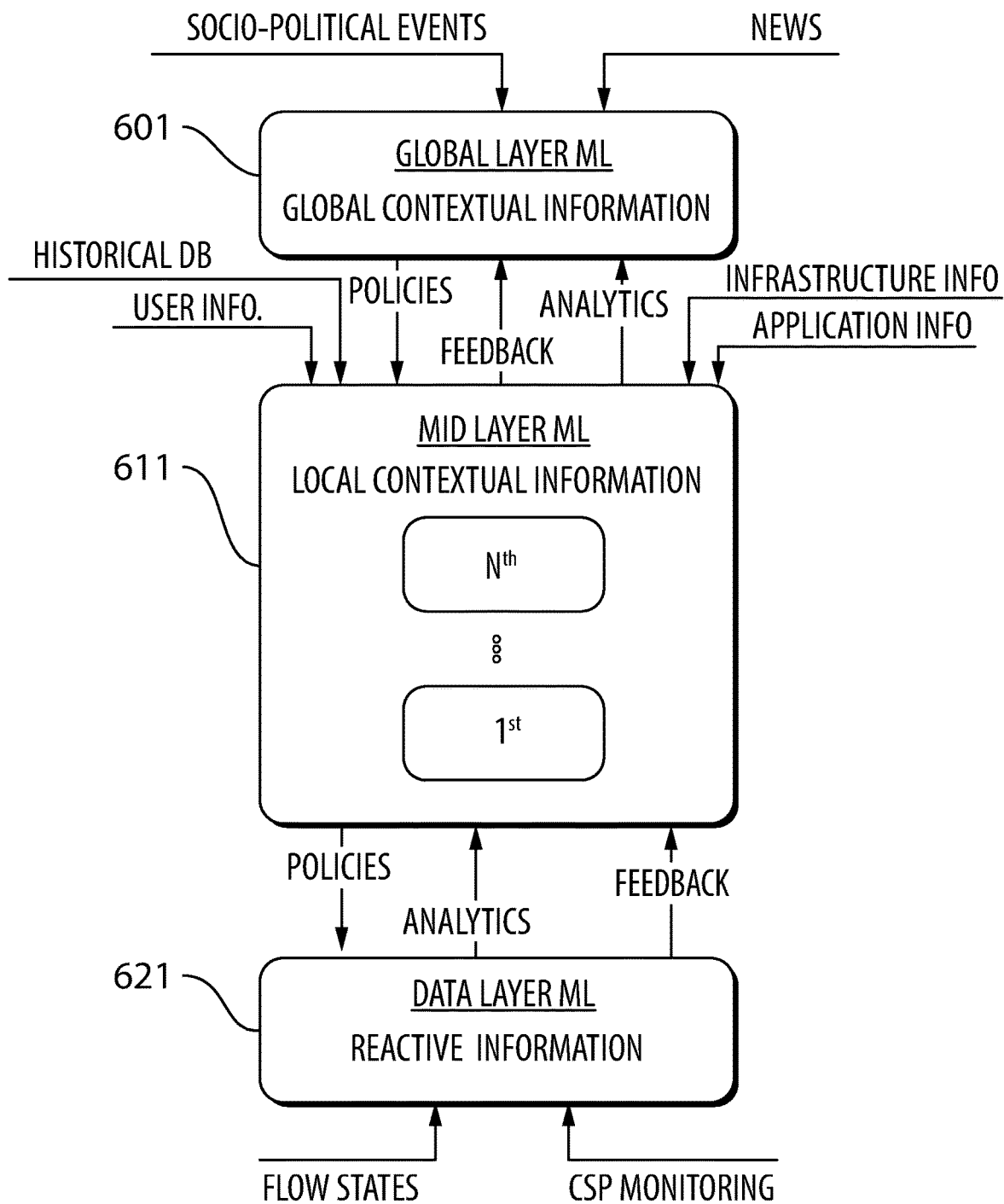
FIG. 16 illustrates a hierarchical learning architecture including inputs and outputs for each level.

The multi-level learning architecture of embodiments of the present invention is referred to as Hierarchical Learning (HL) and is further illustrated in FIG. 16. Global layer (601) is coupled to mid layer (611) which is in turn coupled to data layer (621).

Embodiments of the HL architecture use different Machine Learning techniques in each of the levels. For example, one level can be a Recursive Neural Network (RNN) and the next one can implement Deep Learning (DL). Each level is connected to the others in that the output of the lower level becomes one of the inputs for the higher level. In addition, each layer has its own set of data that complements the layer interconnection.

For example, the data layer has reactive information as input plus the inputs from the mid layers (e.g., policies). In consequence, each level is independent as it could potentially take decisions to ensure the proper functionality of the learning system. For example, in the case that the data layer and its reactive learning algorithms get disconnected from the Cloud, the local learning within the data layer can make decisions to assign the flows to the best CSPs according to the information that layer has available. In this case, the depth of information is not the same as the Cloud, but the system will continue working. Subsequently, when the layers are connected and properly functioning, the abstraction from each level together with the different system vision they have can be exploited.

The infrastructure capabilities become a critical parameter in HL. Since agents are hosted in heterogeneous devices with different capabilities, learning algorithms running in each device are heavily influenced by their executing platform. For example, in some embodiments the VM is deployed in a high-end server, while other cases consider an optimized agent running in resources constrained devices like a mobile phone.

To avoid problems when running on heterogeneous devices, the infrastructure capabilities are taken as an input in each learning level. Capabilities then influence the ML-based decisions through the feedback from one level to another. This design characteristic then results in the autonomous optimization of the Hierarchical Learning according to the underlying infrastructure. In case a node at the data layer can undertake more computation, it communicates this fact to the mid layer. The mid layer then leaves more degrees of freedom in its policies. In the opposite case, an agent can communicate its limited resources so the policies are more constrained thus requiring less computational resources.

ML techniques used in each HL level make decisions based on constraints imposed by policies from higher layers. These policies are defined dynamically according to the information available in each level to manage the system. For example, they specify the flow assignment to the different CSPs available. Each policy leaves different degrees of freedom, which are exploited by the levels below to apply Machine learning techniques without violating those policies.

Some embodiments allow Machine Learning parameters (such as weights in Neural Networks, or probability tables in Bayes Nets) to be exchanged between layers, i.e. knowledge is exchanged that was obtained by replicating the Machine Learning engines already trained. This approach allows each layer to obtain by themselves policies and control commands, ensuring the autonomy of the layers even in the case that they get disconnected from the Cloud. This approach also implies more rapid decision making. In other words, the bottom layers gain the visibility and knowledge of the upper layers and vice versa. Each layer endeavors to update the Machine Learning parameters.

For example, the mid layer sends a policy to the data layer specifying that only CSPs with a throughput larger than 10 Mbps can be used. According to the reactive information, the data layer ML algorithms can optimize the performance based on that policy and the degrees of freedom it has. In this case, the data layer can choose from all the active CSPs that fulfill that condition. Another more restrictive situation would be to use only a specific active CSP. Here, the data layer cannot optimize hardly anything because the policy constrains the available behaviors.

These degrees of freedom are optimized dynamically at each hierarchical level taking into account system variables (capabilities of the agents, contextual information, network configuration, traffic interference, etc.). The HL architecture is similar conceptually to Recurrent Neural Networks (RNNs) that concatenate different iterations over a NN. Moreover, rather than having the NN always the same, different ML techniques are concatenated with new inputs in each level while maintaining the feedback between them.

In embodiments of the present invention, machine learning is applied in different areas. The algorithms inside HL can apply to a wide range of areas, such as: 1. Tunnel discovery (Path information with network nodes traversed based on IP address, Discovery time, etc.); 2. CSP promotion and demotion; 3. CSP state transition; 4. CSP classification according to application type, SLAs, QoE, etc.; 5. Flow and traffic classification; 6. Flow assignments to CSPs (Flow division (how many sub-flows) based on contextual information, infrastructure capabilities, network conditions, etc.); 7. Anticipation of network conditions according to history, events, etc.; and 8. Policy generation (in mid and global layers). These areas are conditioned by the degrees of freedom in each architectural level imposed by policies from higher levels.

The main area in which ML techniques are applied is the flow assignment to the available CSPs. To provide an efficient solution, this assignment needs to be dynamic and adapt to the network fluctuations. The amount of data to consider is large and it greatly varies over time, a fact that poses significant challenges to the architecture. This is in contrast to the CSP/Tunnel discovery that is more static.

To provide optimized flow to CSP assignment, different ML techniques are considered to execute in the HL architecture. In some embodiments at the data layer a Recurrent Neural Network (RNN) is used that deals with real-time reactive information. In the mid and global layers the benefits of the Deep Learning technique are exploited to cover local and global contextual information respectively.

The present invention has been described above in connection with several preferred embodiments. This has been done for purposes of illustration only, and variations of the inventions will be readily apparent to those skilled in the art and also fall within the scope of the invention.

The invention claimed is:

1. A method of utilizing a plurality of connections between network hosts in a system comprising a network coupling the network hosts and capable of communicating information flows between the network hosts, the method comprising:

maintaining a plurality of connections between a first network host comprising at least one network interface including a first network interface and a second network host comprising at least one network interface including a second network interface by performing, for each of said plurality of connections, the sub-steps of:

establishing a connection between the first network host and the second network host, wherein at least two of said plurality of connections are established that utilize both said first network interface and said second network interface;

repeatedly evaluating said connection to determine at least one performance metric associated with said connection;

associating a state for said connection, based on the at least one performance metric associated with said connection, from among a plurality of states, wherein one or more first states from among said plurality of states represents a ready condition and one or more second states from among said plurality of states represents a not ready condition;

wherein said step of maintaining maintains said plurality of connections persistently and independent from the communication of application data;

receiving a request to transfer an application information flow between said first network host and said second network host;

assigning said application information flow to one or more of said connections that have been associated with one or more of said first states; and communicating data from said application information flow over one or more of said plurality of connections based on said step of assigning.

2. The method of claim 1 wherein said plurality of connections are VPN tunnels.

3. The method of claim 1 wherein said at least one performance metric comprises one or more metrics taken from the set consisting of: latency, throughput and packet loss.

4. The method of claim 1 wherein a path taken through said network for one of said plurality of connections is different than a path taken through said network for a second one of said plurality of connections.

5. The method of claim 1 wherein said first host has a plurality of endpoints and at least one of said plurality of connections uses a different one of said endpoints than a second one of said plurality of connections.

6. The method of claim 1 wherein said step of repeatedly evaluating comprises evaluating performance metrics associated with said connection periodically at regular intervals.

7. The method of claim 1 wherein said one or more second states includes states representing conditions of standby, waiting, demoted and probing.

8. The method of claim 1 wherein at least a portion of the network comprises a portion of the public Internet.

9. The method of claim 1 further comprising the sub-step, for each of said plurality of connections, of:

determining a path through said network of said connection.

10. The method of claim 1 further comprising the steps of:

re-assigning said information flow to a different one or more of said connections that have been associated with one or more of said first states, wherein said step of re-assigning is based on at least one performance metric associated with at least one of said plurality of connections; and communicating data from said information flow over one or more of said plurality of connections based on said step of re-assigning.

11. The method of claim 1 further comprising the sub-step, for each of said plurality of connections, of:

terminating said connection when said connection meets a criterion based on said at least one performance metric associated with said connection, wherein said criterion is based on a comparison of the at least one performance metric associated with said connection with one or more other metrics associated with other ones of the plurality of connections.

12. A non-transitory computer readable medium encoded with program code for directing at least one processor to execute the method of claim 1.

13. The method of claim 1 wherein said at least one performance metric comprises a path between the first network host and the second network host.

14. The method of claim 1 wherein a path taken through said network for one of said plurality of connections is the same as a path taken through said network for a second one of said plurality of connections.

15. The method of claim 1 wherein said at least two of said plurality of connections utilize the same source and destination IP addresses and have different TCP or UDP port numbers.

16. An apparatus for communicating information flows between network hosts over a network coupling the network hosts, the apparatus comprising:

a first network host, comprising at least one network interface including a first network interface, comprising at least one processor in communication with least one memory storing processor readable instructions, wherein the at least one processor is operably configured by the processor readable instructions to:

maintain a plurality of connections to a second network host, comprising at least one network interface including a second network interface, by performing, for each of said plurality of connections, the sub-steps of:

establishing a connection to a second network host, wherein at least two of said plurality of connections are established that utilize both said first network interface and said second network interface;

repeatedly evaluating said connection to determine at least one performance metric associated with said connection;

associating a state for said connection, based on the at least one performance metric associated with said connection, from among a plurality of states, wherein one or more first states from among said plurality of states represents a ready condition and one or more second states from among said plurality of states represents a not ready condition;

wherein connections are maintained persistently and independent from the communication of application data;

receive a request to transfer an application information flow to said second network host;

assign said application information flow to one or more of said connections that have been associated with one or more of said first states; and communicate application data from said information flow over one or more of said plurality of connections based on said step of assigning.

17. The apparatus of claim 16 wherein said first host has a plurality of endpoints and at least one of said plurality of connections uses a different one of said endpoints than a second one of said plurality of connections.

18. The apparatus of claim 16 wherein repeatedly evaluating comprises evaluating metrics associated with said connection periodically at regular intervals.

19. The apparatus of claim 16 wherein the at least one processor is further operably configured by the processor readable instructions to:

re-assign said information flow to a different one or more of said connections that have been associated with one or more of said first states, wherein said step of re-assigning is based on at least one performance metric associated with at least one of said plurality of connections; and communicate data from said information flow over one or more of said plurality of connections based on said step of re-assigning.

20. The apparatus of claim 16 wherein the at least one processor is further operably configured by the processor readable instructions to perform the the sub-step, for each of said plurality of connections, of:

terminating said connection when said connection meets a criterion based on said at least one performance metric associated with said connection, wherein said criterion is based on a comparison of the at least one performance metric associated with said connection with one or more other metrics associated with other ones of the plurality of connections.

21. The apparatus of claim 16 wherein said at least one performance metric comprises a path between the first network host and the second network host.

22. The apparatus of claim 16 wherein a path taken through said network for one of said plurality of connections is the same as a path taken through said network for a second one of said plurality of connections.

23. The apparatus of claim 16 wherein said at least two of said plurality of connections utilize the same source and destination IP addresses and have different TCP or UDP port numbers.

* * * * *